(12) United States Patent
Lu

(10) Patent No.: US 12,526,941 B2
(45) Date of Patent: Jan. 13, 2026

(54) SUPPORT FRAME

(71) Applicant: Qisda Corporation, Taoyuan (TW)

(72) Inventor: Kuang-Heng Lu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 148 days.

(21) Appl. No.: 18/610,298

(22) Filed: Mar. 20, 2024

(65) Prior Publication Data

US 2024/0389248 A1 Nov. 21, 2024

(30) Foreign Application Priority Data

May 16, 2023 (CN) .......................... 202310550125.0

(51) Int. Cl.
*H05K 5/02* (2006.01)
*G06F 1/16* (2006.01)

(52) U.S. Cl.
CPC ......... *H05K 5/0226* (2013.01); *H05K 5/0234* (2013.01); *G06F 1/166* (2013.01)

(58) Field of Classification Search
None
See application file for complete search history.

(56) References Cited

U.S. PATENT DOCUMENTS

| | | | | |
|---|---|---|---|---|
| 8,824,158 B2 * | 9/2014 | Huang | ..................... | H04M 1/04 361/759 |
| 9,788,621 B2 * | 10/2017 | Kim | ..................... | A45F 5/00 |
| 9,864,415 B2 * | 1/2018 | Siddiqui | ..................... | G06F 1/1679 |
| 9,933,009 B1 * | 4/2018 | Zaloom | ..................... | A45C 13/36 |
| 10,028,398 B1 * | 7/2018 | Lin | ..................... | E05D 11/06 |
| 11,459,792 B2 * | 10/2022 | Westphall | ..................... | G06F 1/182 |
| 2007/0164191 A1 * | 7/2007 | Kim | ..................... | F16C 11/10 248/688 |
| 2011/0164358 A1 * | 7/2011 | Duan | ..................... | H05K 5/0234 361/679.01 |
| 2013/0107427 A1 * | 5/2013 | Cheng | ..................... | F16M 11/10 361/679.01 |
| 2013/0242472 A1 * | 9/2013 | Guo | ..................... | F16M 11/10 248/688 |

(Continued)

FOREIGN PATENT DOCUMENTS

| | | |
|---|---|---|
| CN | 105500407 | 4/2019 |
| CN | 113050759 | 6/2021 |

(Continued)

*Primary Examiner* — Allen L Parker
*Assistant Examiner* — Christopher L Augustin

(57) ABSTRACT

A support frame includes a movable element, a switch assembly, and at least one elastic element. The movable element includes a body, a first cavity, and a second cavity. The switch assembly includes a button and a cam. The elastic element is disposed in the electronic body and at least connected between the switch assembly and the electronic body. When the elastic element pushes the switch assembly so that the switch assembly is in a first position, the cam is inserted into the first cavity or the second cavity of the movable element to limit the rotation of the movable element relative to the electronic body. When the switch assembly linearly moves to a second position by resisting at least one elastic force of the elastic element, the movable element rotates relative to the electronic body to expand or close to the electronic body.

20 Claims, 31 Drawing Sheets

(56) References Cited

U.S. PATENT DOCUMENTS

2016/0252207 A1\* 9/2016 Hollenberg ............ F16M 11/38
  73/866.5
2019/0394893 A1\* 12/2019 Wu ........................ H05K 5/023
2021/0204420 A1\* 7/2021 Chen ..................... H05K 5/023

FOREIGN PATENT DOCUMENTS

CN  216658021  6/2022
TW  I281843 B  \*  5/2007

\* cited by examiner

SUPPORT FRAME

CROSS-REFERENCE TO RELATED APPLICATION

This application claims the priority benefit of China application serial no. 202310550125.0, filed on May 16, 2023. The entirety of the above-mentioned patent application is hereby incorporated by reference herein and made a part of this specification.

BACKGROUND

Technical Field

The disclosure relates to a support frame, and particularly relates to a support frame suitable for supporting an electronic body.

Description of Related Art

Generally, regarding a support frame used to support monitors, tablets, or mobile phones, the movable element (i.e. the leg of the frame) thereof merely has a simple opening and closing function but cannot prevent the movable element from being opened when closed, or from being closed when opened. If to use a hinge-type movable element in order to prevent the above-mentioned events from happening, then a large space is required and the cost is expensive, which has the disadvantages of being large in size and high in cost.

SUMMARY

The disclosure provides a support frame, which is suitable for supporting an electronic body and allows a movable element to be fixed in a specific expanded or closed position, and has the advantages of being small in size and low in cost.

The support frame according to the disclosure is suitable for supporting the electronic body. The support frame includes a movable element, a switch assembly, and at least one elastic element. The movable element includes a body, a first cavity, and a second cavity. The first cavity and the second cavity are separated from each other and positioned on a terminal portion of the body. The terminal portion is pivotally connected to the electronic body and positioned in the electronic body. The switch assembly includes a button and a cam. The button is exposed on the electronic body, and the cam is positioned in the electronic body. The elastic element is disposed in the electronic body and at least connected between the switch assembly and the electronic body. When the elastic element pushes the switch assembly so that the switch assembly is in a first position, the cam is inserted into the first cavity or the second cavity of the movable element to limit the rotation of the movable element relative to the electronic body. When the switch assembly linearly moves to a second position by resisting at least one elastic force of the elastic element, the movable element rotates relative to the electronic body to expand or close to the electronic body.

In an embodiment according to the disclosure, a back surface of the electronic body has an opening, the button passes through the opening and is exposed on the electronic body, and the button is suitable for moving parallel to the back surface within the opening.

In an embodiment according to the disclosure, the support frame further includes a cover plate, which is locked in the electronic body and includes a first portion and a second portion. There is a fastener hole between the first portion and the second portion. The cam is fixed on the first portion. The switch assembly further includes a fastening portion, and the fastening portion is disposed corresponding to the second portion and integrally formed with the button. The fastening portion is removably fastened in the fastener hole, so that the cam is removably inserted into the first cavity or the second cavity of the movable element.

In an embodiment according to the disclosure, the fastening portion has an inclined surface, and the second portion has a folded section. The folded section is disposed corresponding to and matching the inclined surface. When the switch assembly linearly moves to the second position by resisting the elastic force of the elastic element, the folded section of the second portion limits the movement of the switch assembly within the opening.

In an embodiment according to the disclosure, when the fastening portion is fastened in the fastener hole, the orthographic projection of the fastening portion on the first portion partially overlaps the orthographic projection of the cam on the first portion.

In an embodiment according to the disclosure, the elastic element includes two elastic elements, and each elastic element is a spring.

In an embodiment according to the disclosure, the elastic element includes a first elastic element and a second elastic element. The elastic forces include a first elastic force and a second elastic force. The first elastic element is connected between the switch assembly and the electronic body, and the second elastic element is connected to the movable element.

In an embodiment according to the disclosure, when the switch assembly linearly moves to the second position by resisting the first elastic force of the first elastic element, the movable element rotates relative to the electronic body by the second elastic force of the second elastic element and expands relative to the electronic body.

In an embodiment according to the disclosure, the first elastic element is a spring, and the second elastic element is a torsion spring.

In an embodiment according to the disclosure, the electronic body further includes a limiting cavity, the switch assembly is born within the limiting cavity, and the limiting cavity limits the movement of the switch assembly within the opening.

In an embodiment according to the disclosure, the back surface of the electronic body has an opening, the button passes through the opening and is exposed on the electronic body, and the button is suitable for moving perpendicular to the back surface within the opening.

In an embodiment according to the disclosure, the support frame further includes a cover plate, which is locked in the electronic body and has a limiting hole. The switch assembly further includes a limiting column, and the limiting column, the cam, and the button are integrally formed. The limiting column is movably sleeved in the limiting hole, so that the cam is removably inserted into the first cavity or the second cavity of the movable element.

In an embodiment according to the disclosure, the cover plate includes a limiting cavity disposed corresponding to the cam. When the switch assembly linearly moves to the second position by resisting the elastic force of the elastic element, the limiting cavity limits the movement of the switch assembly within the opening.

In an embodiment according to the disclosure, the elastic element includes multiple elastic elements, and each elastic element is a spring.

In an embodiment according to the disclosure, the button has a rounded surface or a chamfered surface.

In an embodiment according to the disclosure, there is an included angle between the first cavity and the second cavity, and the included angle is greater than or equal to 90 degrees.

In an embodiment according to the disclosure, the support frame further includes a rotation shaft, which is connected to the electronic body and passes through the terminal portion of the movable element. The movable element rotates relative to the electronic body with the rotation shaft as the axis.

In an embodiment according to the disclosure, when the support frame is in a closed state, the switch assembly is in the first position, the cam is inserted into the first cavity of the movable element, and the movable element is contained in a containing cavity of the electronic body.

In an embodiment according to the disclosure, when the support frame is in an opening process, the switch assembly is in the second position, and the movable element rotates relative to the electronic body and gradually expands from the electronic body. When the support frame is in a closing process, the switch assembly is in the second position, and the movable element rotates relative to the electronic body and gradually closes in the containing cavity of the electronic body.

In an embodiment according to the disclosure, when the support frame is in an open state, the switch assembly is in the first position, the cam is inserted into the second cavity of the movable element, and the movable element expands from the electronic body to support the electronic body.

Based on the above, in the design of the support frame according to the disclosure, when the elastic element pushes the switch assembly so that the switch assembly is in the first position, the cam is inserted into the first cavity or the second cavity of the movable element to limit the rotation of the movable element relative to the electronic body. When the switch assembly linearly moves to the second position by resisting the elastic force of the elastic element, the movable element rotates relative to the electronic body to expand or close to the electronic body. That is to say, in the support frame according to the disclosure, the movable element can be fixed in a specific expanded or closed position through the elastic element accumulating and releasing the mechanical energy, thereby achieving the purpose of being small in size and low in cost.

In order to make the above features and advantages of the disclosure more comprehensible, the embodiments are described in detail with the accompanying drawings.

DESCRIPTION OF THE EMBODIMENTS

Figure 1A:
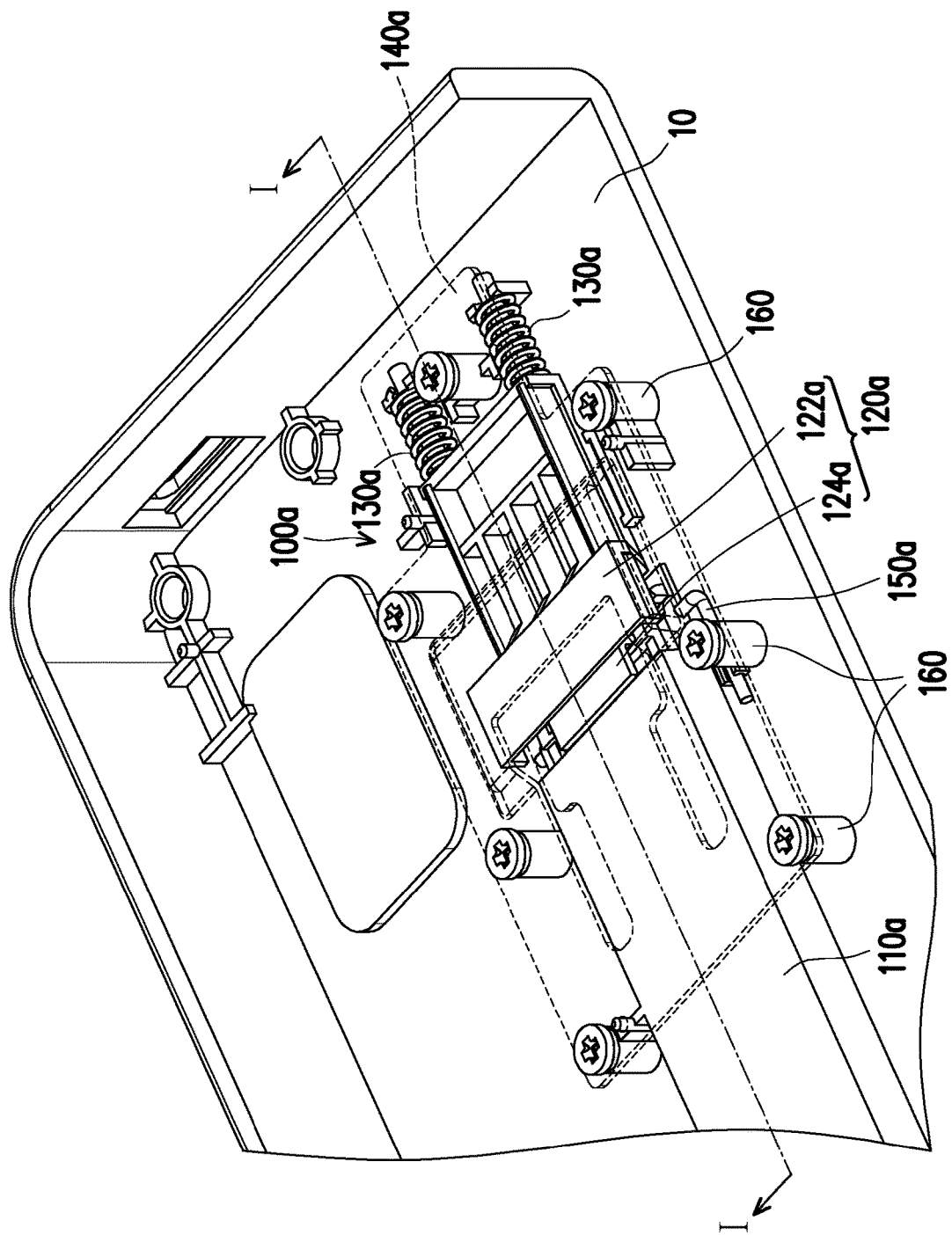
FIG. 1A is a schematic three-dimensional view of a support frame which supports an electronic body according to an embodiment of the disclosure.
Figure 1B:
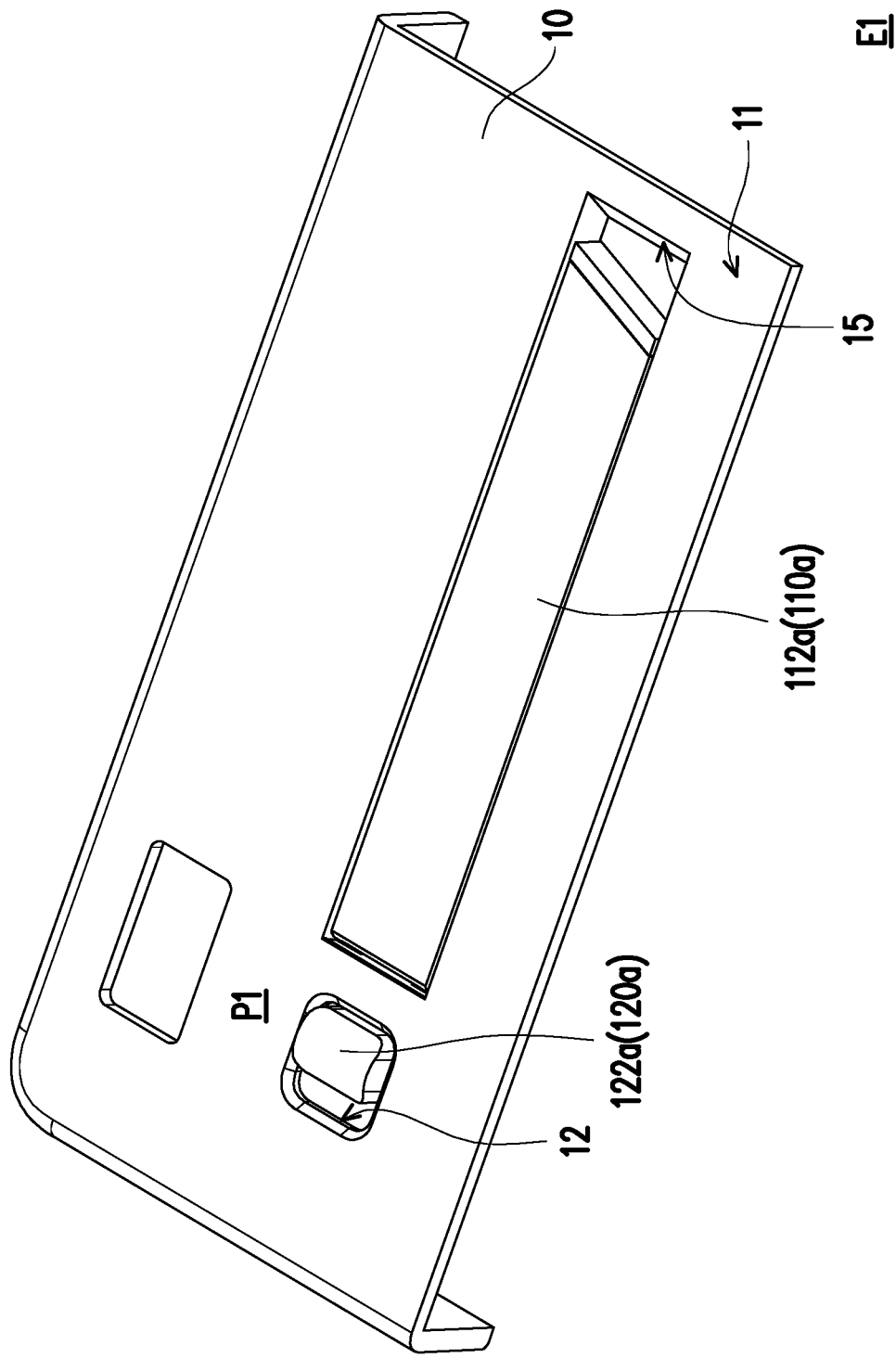
FIG. 1B is a schematic three-dimensional view of the support frame in FIG. 1A in a closed state.
Figure 1C:
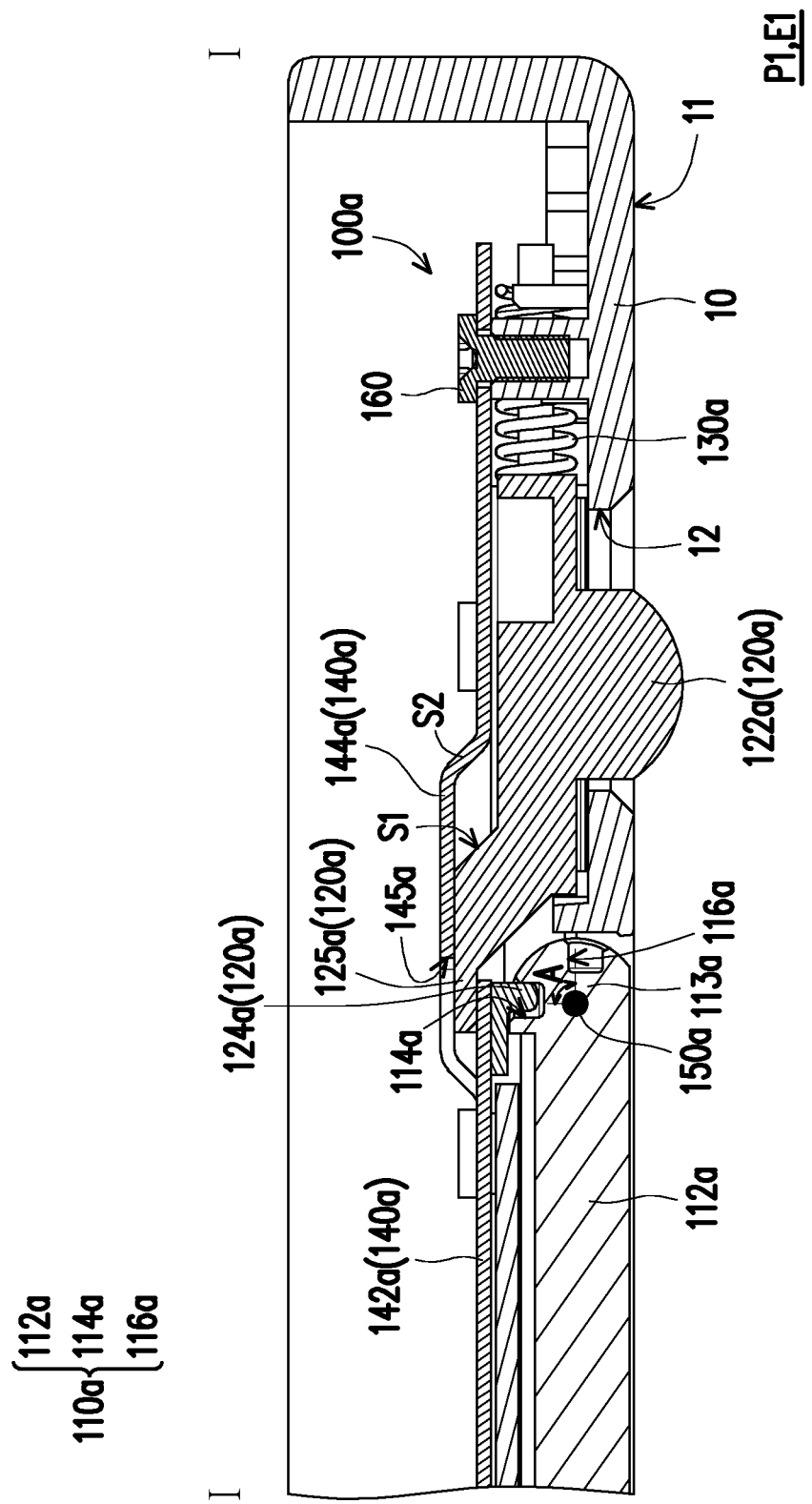
FIG. 1C is a schematic cross-sectional view of the support frame in the closed state along a line I-I in FIG. 1A.
Figure 1D:
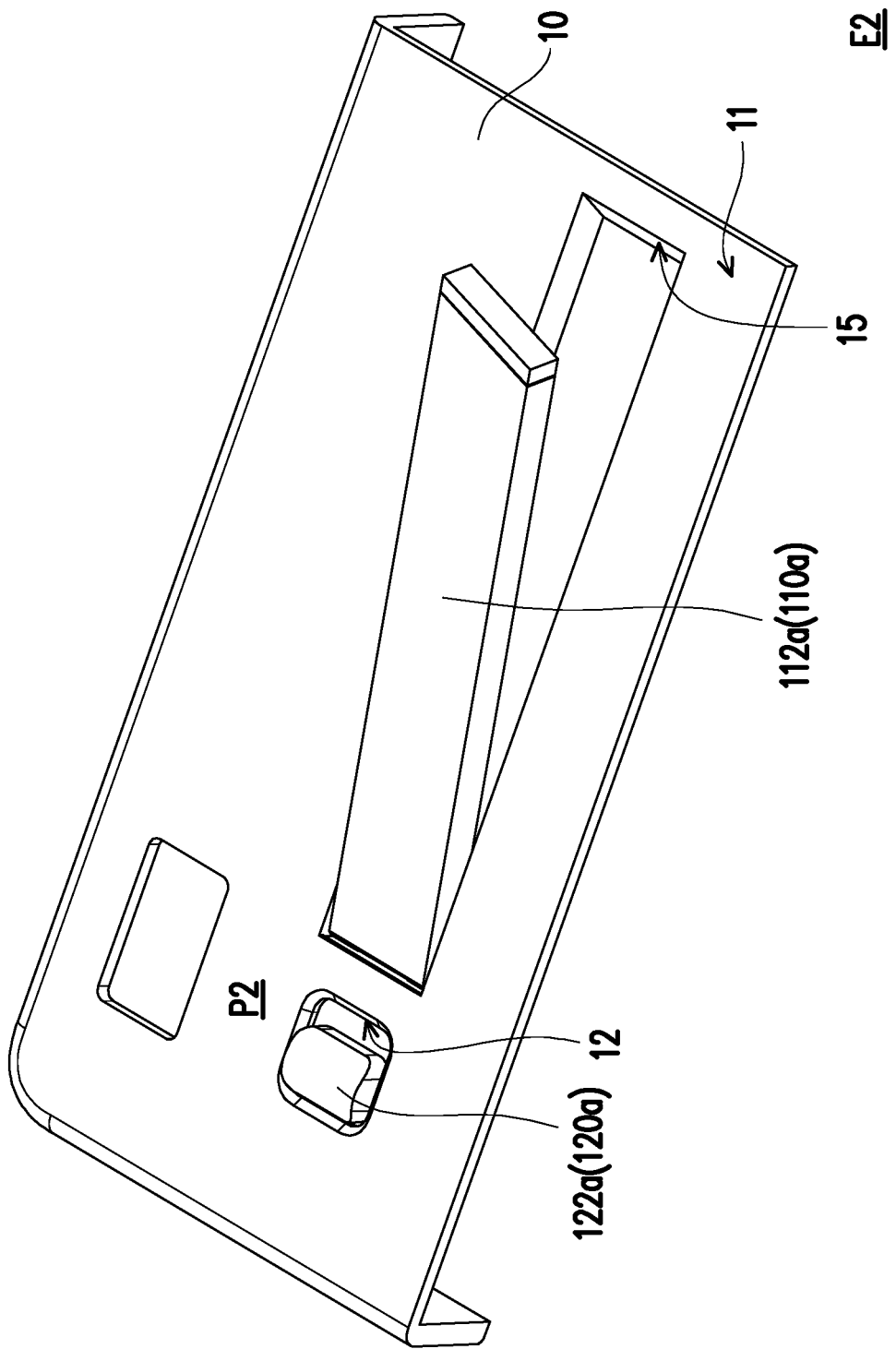
FIG. 1D is a schematic three-dimensional view of the support frame in FIG. 1A in the opening process.
Figure 1E:
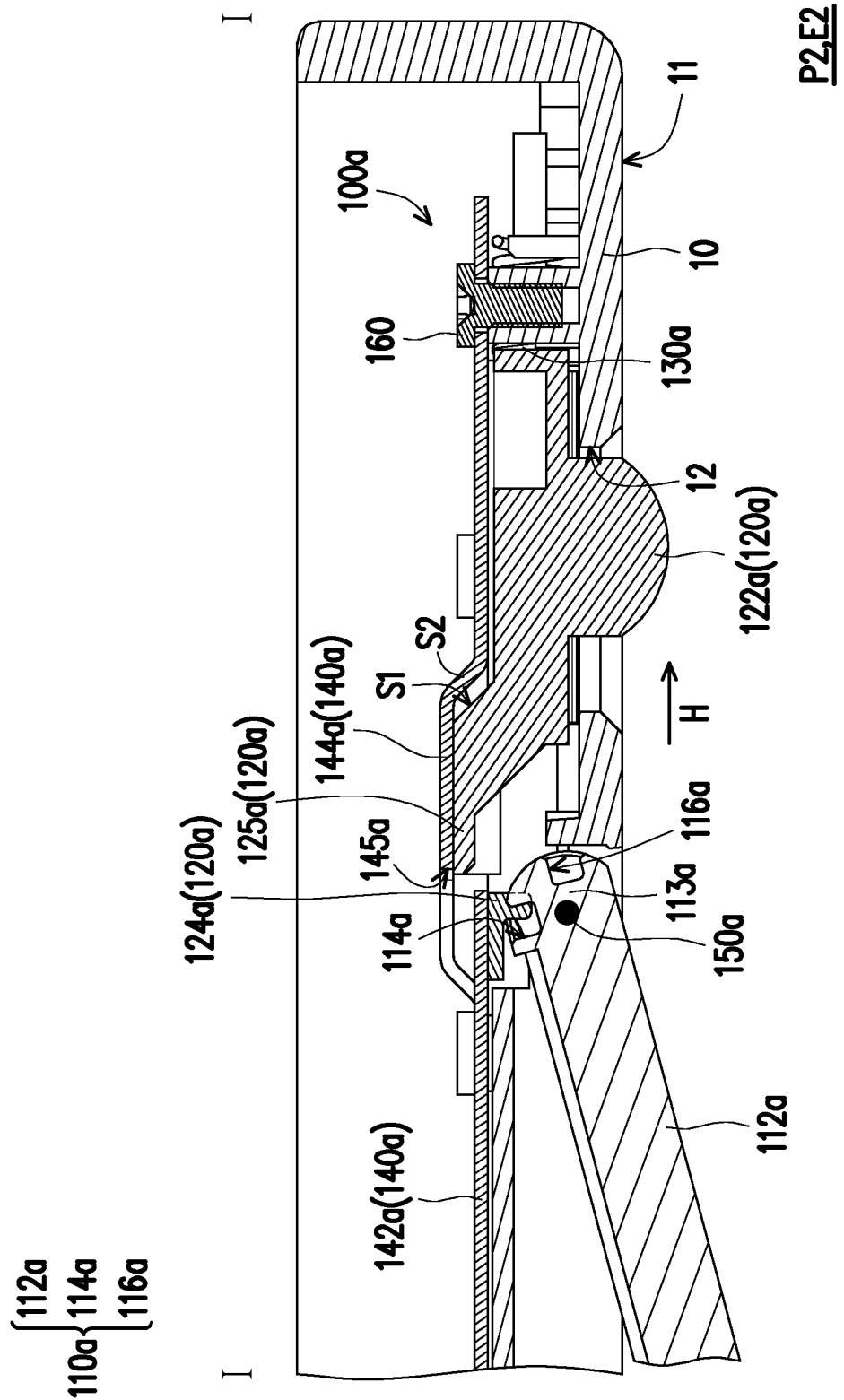
FIG. 1E is a schematic cross-sectional view of the support frame in the opening process along the line I-I in FIG. 1A.
Figure 1F:
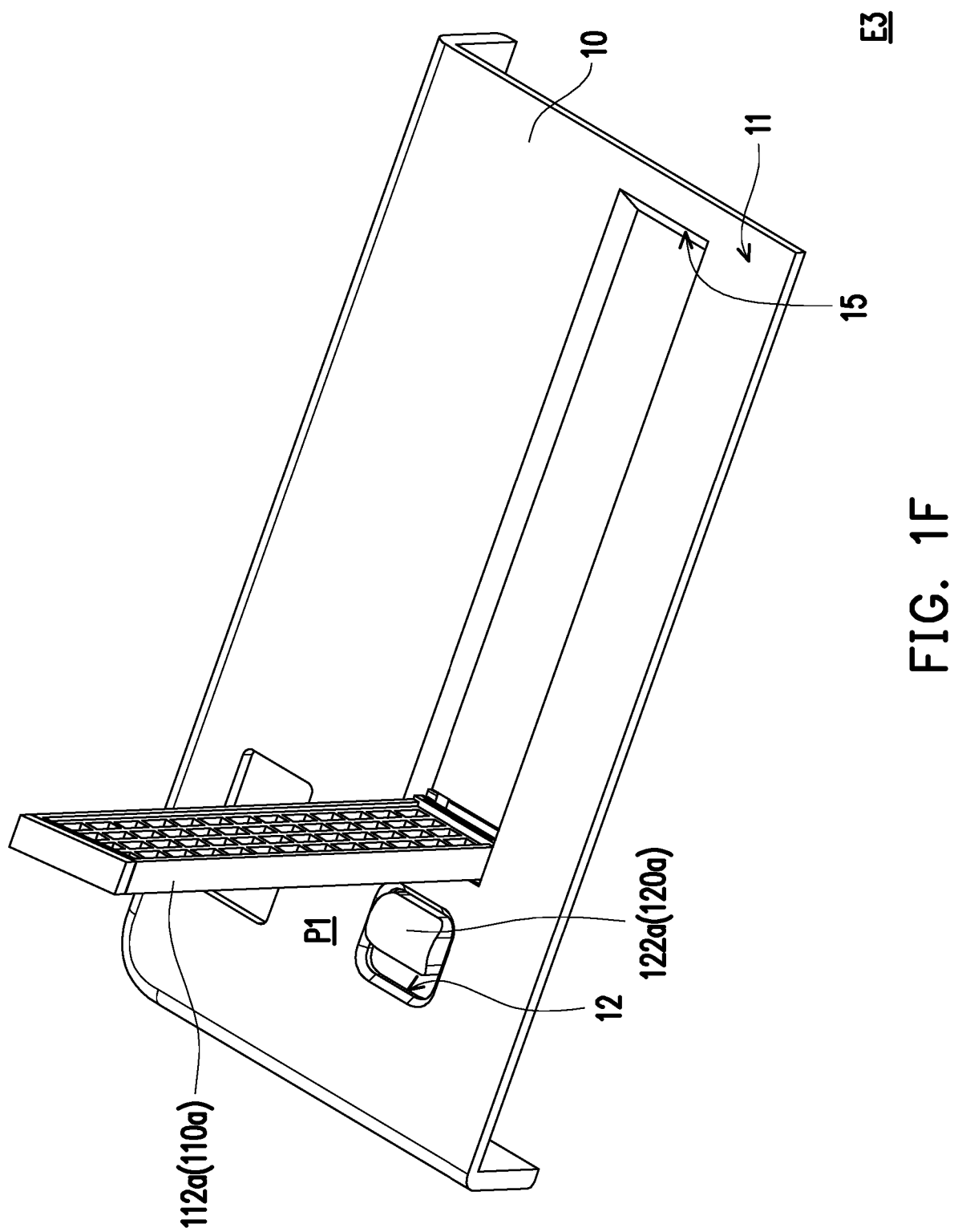
FIG. 1F is a schematic three-dimensional view of the support frame in FIG. 1A in an open state.
Figure 1G:
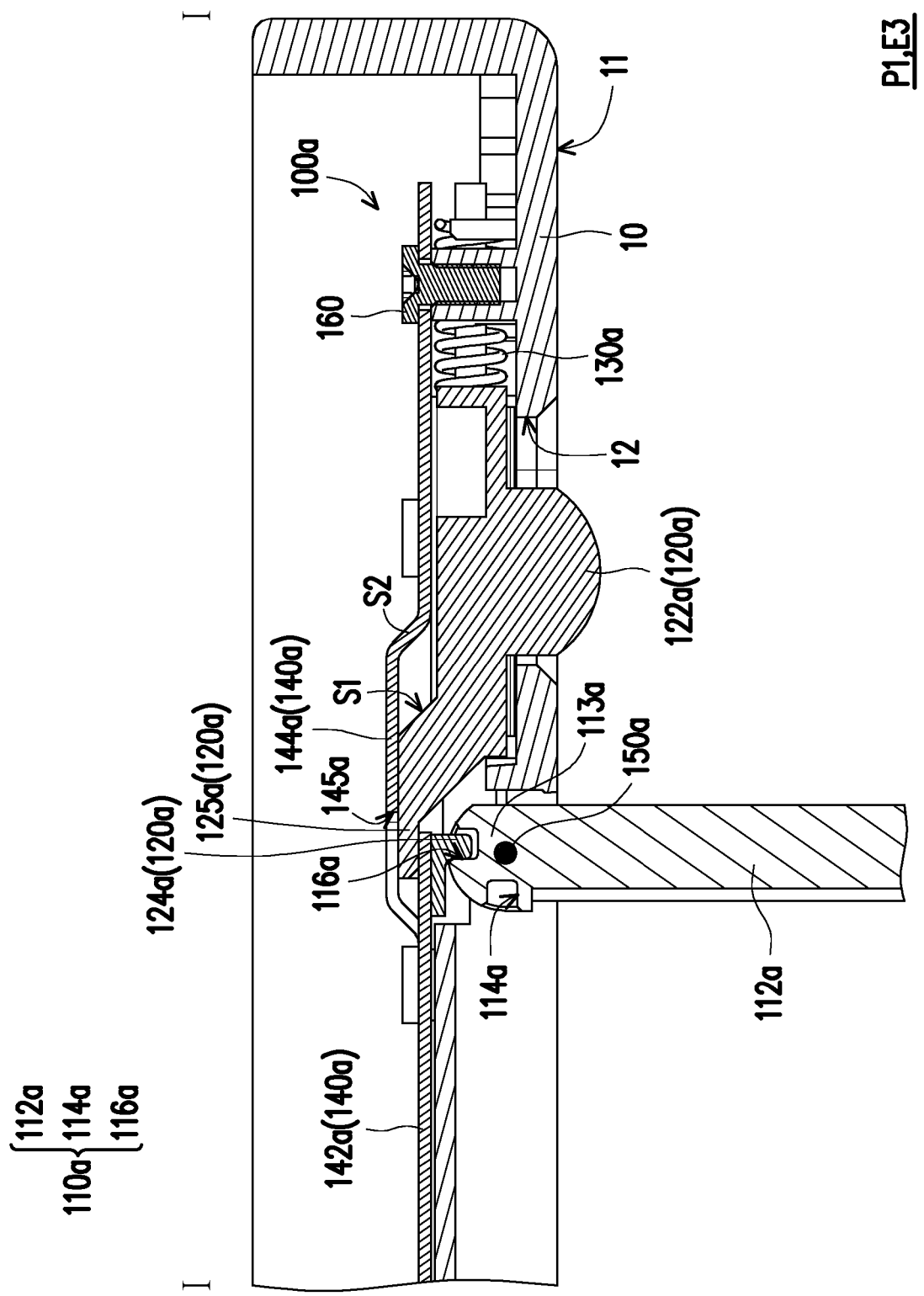
FIG. 1G is a schematic cross-sectional view of the support frame in the open state along the line I-I in FIG. 1A.
Figure 1H:
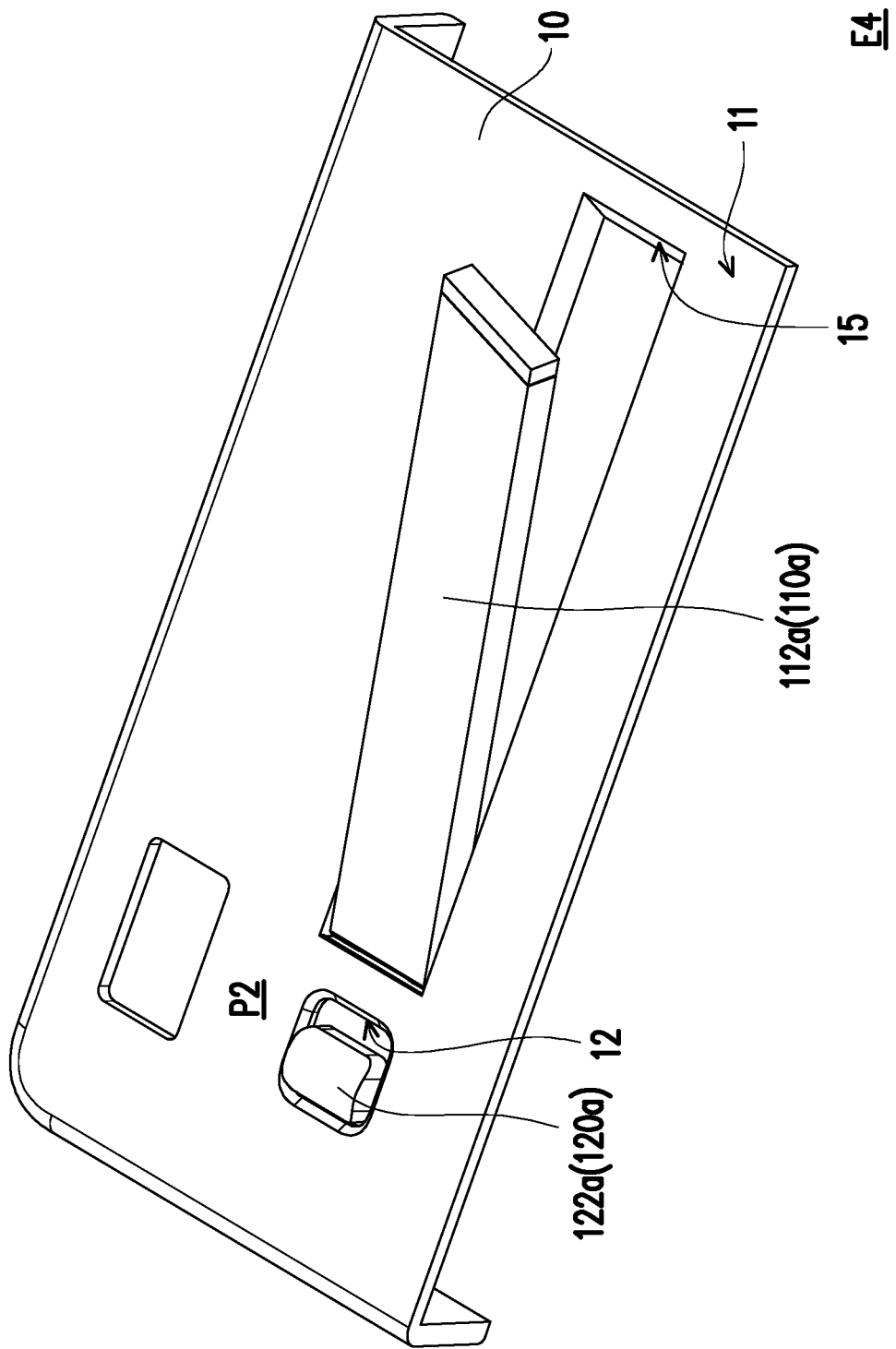
FIG. 1H is a schematic three-dimensional view of the support frame in FIG. 1A in a closing process.
Figure 1I:
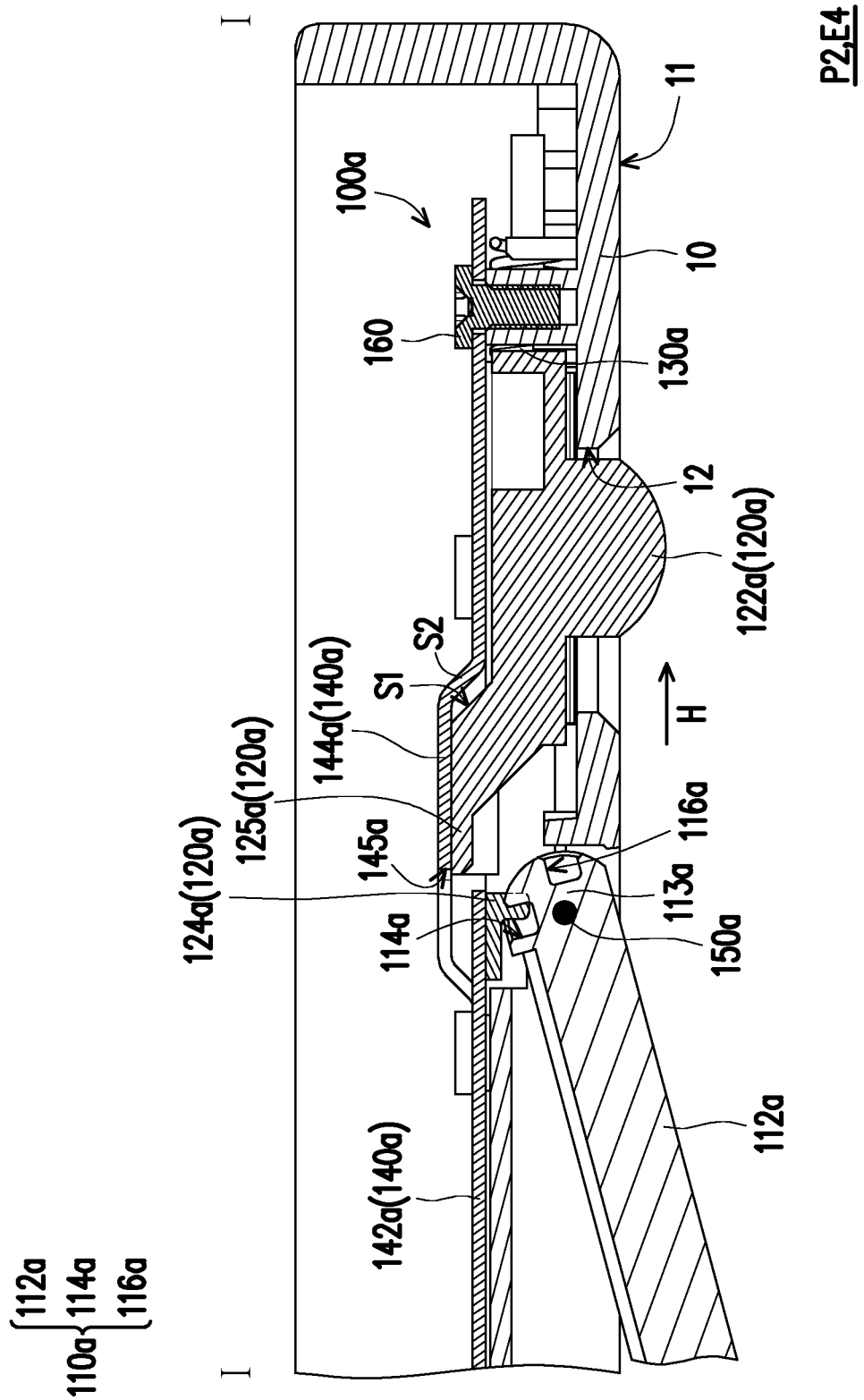
FIG. 1I is a schematic cross-sectional view of the support frame in the closing process along the line I-I in FIG. 1A.

FIG. 1A is a schematic three-dimensional view of a support frame which supports an electronic body according to an embodiment of the disclosure. FIG. 1B is a schematic three-dimensional view of the support frame in FIG. 1A in a closed state. FIG. 1C is a schematic cross-sectional view of the support frame in the closed state along a line I-I in FIG. 1A. FIG. 1D is a schematic three-dimensional view of the support frame in FIG. 1A in the opening process. FIG. 1E is a schematic cross-sectional view of the support frame in the opening process along the line I-I in FIG. 1A. FIG. 1F is a schematic three-dimensional view of the support frame in FIG. 1A in an open state. FIG. 1G is a schematic cross-sectional view of the support frame in the open state along the line I-I in FIG. 1A. FIG. 1H is a schematic three-dimensional view of the support frame in FIG. 1A in a closing process. FIG. 1I is a schematic cross-sectional view of the support frame in the closing process along the line I-I in FIG. 1A. It should be noted that, for convenience of explanation, a cover plate 140a in FIG. 1A is represented by a dotted line.

Please refer to FIG. 1A, FIG. 1B, and FIG. 1C at the same time. In this embodiment, a support frame 100a is suitable for supporting an electronic body 10. The support frame 100a includes a movable element 110a, a switch assembly 120a, and at least one elastic element 130a. The movable element 110a includes a body 112a, a first cavity 114a, and a second cavity 116a. The first cavity 114a and the second cavity 116a are separated from each other and positioned on a terminal portion 113a of the body 112a. The terminal portion 113a is pivotally connected to the electronic body 10 and positioned in the electronic body 10. The switch assembly 120a includes a button 122a and a cam 124a. The button 122a is exposed on the electronic body 10, and the cam 124a is positioned in the electronic body 10. The elastic element 130a is disposed in the electronic body 10 and at least connected between the switch assembly 120a and the electronic body 10.

Specifically, the electronic body 10 is, for example, a monitor, a tablet, a mobile phone, or a tablet screen, but is not limited thereto, and the support frame 100a is assembled on the electronic body 10 to support the electronic body 10. The movable element 110a is, for example, the legs of the frame, and there is an included angle A between the first cavity 114a and the second cavity 116a, in which the included angle A is, for example, greater than or equal to 90 degrees. It should be noted that, the position of the cavity may be adjusted to meet the needs of different closing or opening angles. A back surface 11 of the electronic body 10 has an opening 12, and the button 122a of the switch assembly 120a is suitable for passing through the opening 12 and being exposed on the electronic body 10. The button 122a of the switch assembly 120a is suitable for moving parallel to the back surface 11 within the opening 12, which means moving horizontally along the back surface 11 of the electronic body 10 to present the open/closed state, which is horizontal sliding unlocking. In an embodiment, the button 122a may have a rounded surface or a chamfered surface, which can make the horizontal movement smooth. As shown in FIG. 1A, the elastic element 130a of this embodiment is parallel to the electronic body 10 and disposed between the switch assembly 120a and the electronic body 10. Here, the elastic element 130a is, for example, a spring, and the quantity is embodied as two, but not limited thereto.

Furthermore, as shown in FIG. 1A and FIG. 1C, the support frame 100a of this embodiment also includes the cover plate 140a, which is locked in the electronic body 10 through a locking element 160. The cover plate 140a includes a first portion 142a and a second portion 144a, in which a fastener hole 145a is between the first portion 142a and the second portion 144a. The cam 124a of the switch assembly 120a is fixed on the first portion 142a. Here, the switch assembly 120a further includes a fastening portion 125a, in which the fastening portion 125a is disposed corresponding to the second portion 144a and is, for example, integrally formed with the button 122a. The fastening portion 125a is removably fastened in the fastener hole 145a, so that the cam 124a is removably inserted into the first cavity 114a or the second cavity 116a of the movable element 110a. As shown in FIG. 1C, the fastening portion 125a of the switch assembly 120a has an inclined surface S1, and the second portion 144a of the cover plate 140a has a folded section S2, in which the folded section S2 is disposed corresponding to and matching the inclined surface S1, which can realize the function of limiting the horizontal movement of the switch assembly 120a. In short, the purpose of disposing the cover plate 140a of this embodiment is to limit the switch assembly 120a and to provide strength for resistance testing. In addition, the support frame 100a of this embodiment further includes a rotation shaft 150a, which is connected to the electronic body 10 and passes through the terminal portion 113a of the movable element 110a. The movable element 110a rotates relative to the electronic body 10 with the rotation shaft 150a as the axis.

Please refer to FIG. 1B and FIG. 1C at the same time. In this embodiment, when the support frame 100a is in a closed state E1, the elastic element 130a pushes the switch assembly 120a, so that the fastening portion 125a of the switch assembly 120a is fastened in the fastener hole 145a, and the switch assembly 120a is in a first position P1. At this time, the fastening portion 125a is fastened in the fastener hole 145a, which means filling the gap between the first portion 142a and the second portion 144a of the cover plate 140a, which can provide strength for resistance testing. The orthographic projection of the fastening portion 125a on the first portion 142a partially overlaps the orthographic projection of the cam 124a on the first portion 142a, and the cam 124a of the switch assembly 120a is inserted into the first cavity 114a of the movable element 110a, which can limit the rotation of the movable element 110a relative to the electronic body 10. That is to say, the movable element 110a can be fixed and contained in a containing cavity 15 of the electronic body 10 and cannot be rotated and automatically opened, which can prevent the movable element 110a from automatically opening in the closed state E1.

Next, please refer to FIG. 1D and FIG. 1E at the same time. When the support frame 100a is in an opening process E2, the user uses one hand to push the switch assembly 120a along a horizontal direction H parallel to the back surface 11 of the electronic body 10, so that the switch assembly 120a linearly moves to a second position P2 by resisting the elastic force of the elastic element 130a. At this time, the fastening portion 125a of the switch assembly 120a moves horizontally away from the fastener hole 145a to create a gap, and the folded section S2 of the second portion 144a of the cover plate 140a can limit the movement of the switch assembly 120a within the opening 12. The cam 124a of the switch assembly 120a can retreat due to the gap, and the movable element 110a lacks the stop of the cam 124a, so that the user can use the other hand to open the movable element 110a (that is, to provide a hand feel), so that the movable element 110a can rotate relative to the electronic body 10 and gradually expand from the electronic body 10.

Afterward, please refer to FIG. 1F and FIG. 1G at the same time. When the support frame 100a is in an open state E3, the elastic element 130a pushes the switch assembly 120a, so that the fastening portion 125a of the switch assembly 120a is fastened in the fastener hole 145a, so that the switch assembly 120a is again in the first position P1. At this time, the orthographic projection of the fastening portion 125a on the first portion 142a partially overlaps the orthographic projection of the cam 124a on the first portion 142a, and the cam 124a of the switch assembly 120a is inserted into the second cavity 116a of the movable element 110a, which can limit the rotation of the movable element. 110a relative to the electronic body 10. That is to say, the movable element 110a can be fixed and expanded from the electronic body 10 to support the electronic body 10 and cannot be rotated and automatically closed, which can prevent the movable element 110a from automatically closing when in the open state E3.

Finally, please refer to FIG. 1H and FIG. 1I at the same time. When the support frame 100a is in a closing process E4, the user uses one hand to push the switch assembly 120a along the horizontal direction H, so that the switch assembly 120a linearly moves to the second position P2 by resisting the elastic force of the elastic element 130a. At this time, the folded section S2 of the second portion 144a of the cover plate 140a can limit the movement of the switch assembly 120a within the opening 12, the movable element 110a lacks the stop of the cam 124a, and the user can use the other hand to close the movable element 110a (that is, to provide a hand feel), so that the movable element 110a can rotate relative to the electronic body 10 and gradually close in the containing cavity 15 of the electronic body 10. That is to say, the support frame 100a of the embodiment can expand or close through operating the movable element 110a with both hands.

In the design of the support frame 100a of this embodiment, when the elastic element 130a pushes the switch assembly 120a so that the switch assembly 120a is in the first position P1, the cam 124a is inserted into the first cavity 114a or the second cavity 116a of the movable element 110a to limit the rotation of the movable element 110a relative to the electronic body 10. When the switch assembly 120a linearly moves to the second position P2 by resisting the elastic force of the elastic element 130a, the movable element 110a rotates relative to the electronic body 10 to expand or close to the electronic body 10. That is to say, in the support frame 100a of this embodiment, the movable element 110a can be fixed in a specific expanded or closed position through the elastic element 130a accumulating and releasing the mechanical energy, and since the cam 124a can be inserted into the first cavity 114a or the second cavity 116a of the movable element 110a, not only can a great strength be provided to meet the usage scenario, but also a thin effect can be achieved. In addition, the position of the switch assembly 120a and the position of the movable element 110a are staggered in the thickness direction, in which the switch assembly 120a is positioned on a back side of the movable element 110a, so that the thin effect can be achieved in terms of the overall thickness of the support frame 100a. In short, the support frame 100a of this embodiment has the advantages of being small and thin in size. Furthermore, since it is not necessary to use a hinge-type movable element, the advantage of being low in cost is achieved.

It has to be noted here that the following embodiment follows the reference numerals and part of the content of the aforementioned embodiment, in which the same reference numerals are used to represent the same or similar components, and descriptions of the same technical content are omitted. For descriptions of the omitted part, reference may be made to the aforementioned embodiment, and will not be repeated in the following embodiment.

Figure 2A:
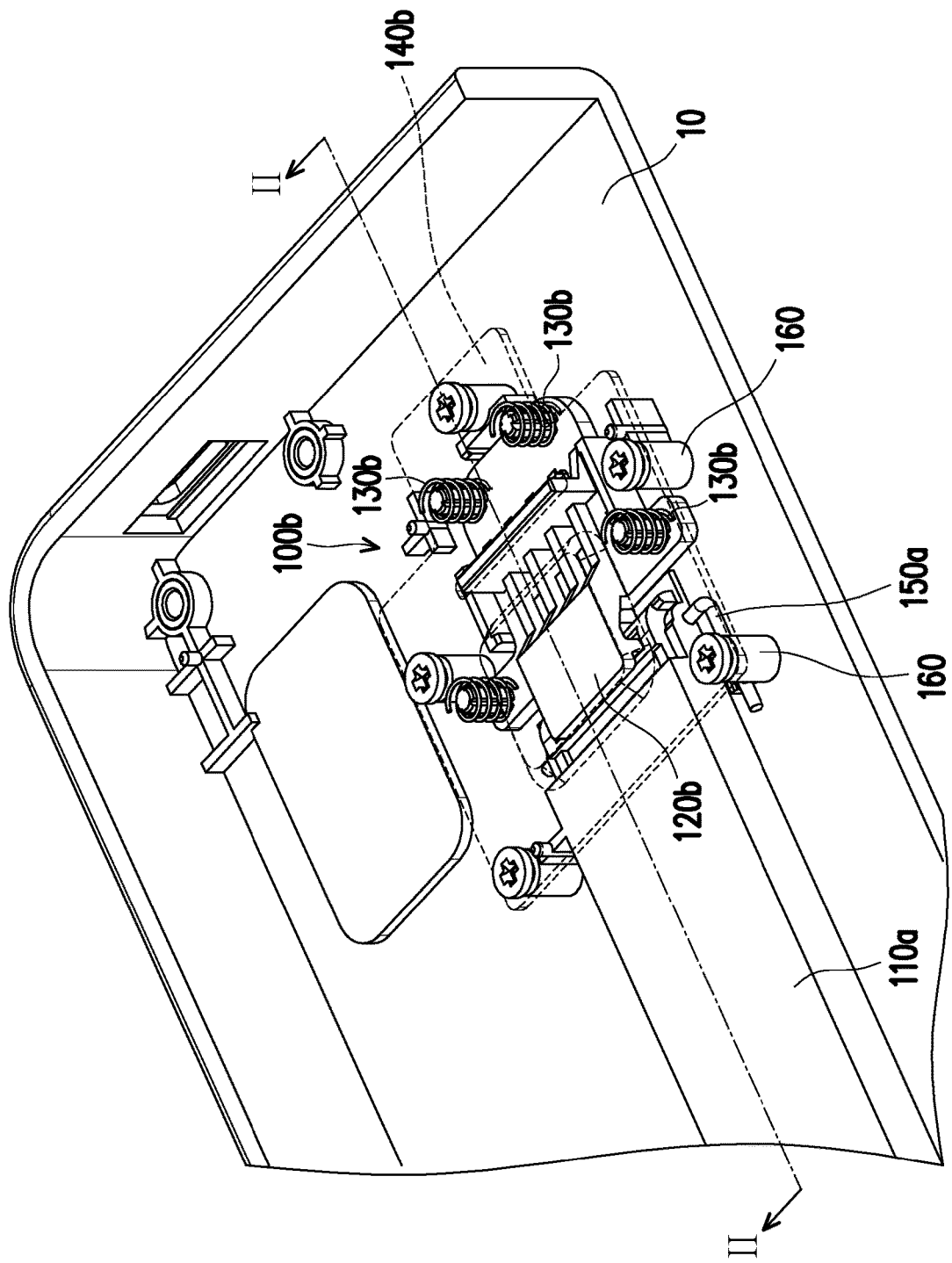
FIG. 2A is a schematic three-dimensional view of a support frame of which supports an electronic body according to an embodiment of the disclosure.
Figure 2B:
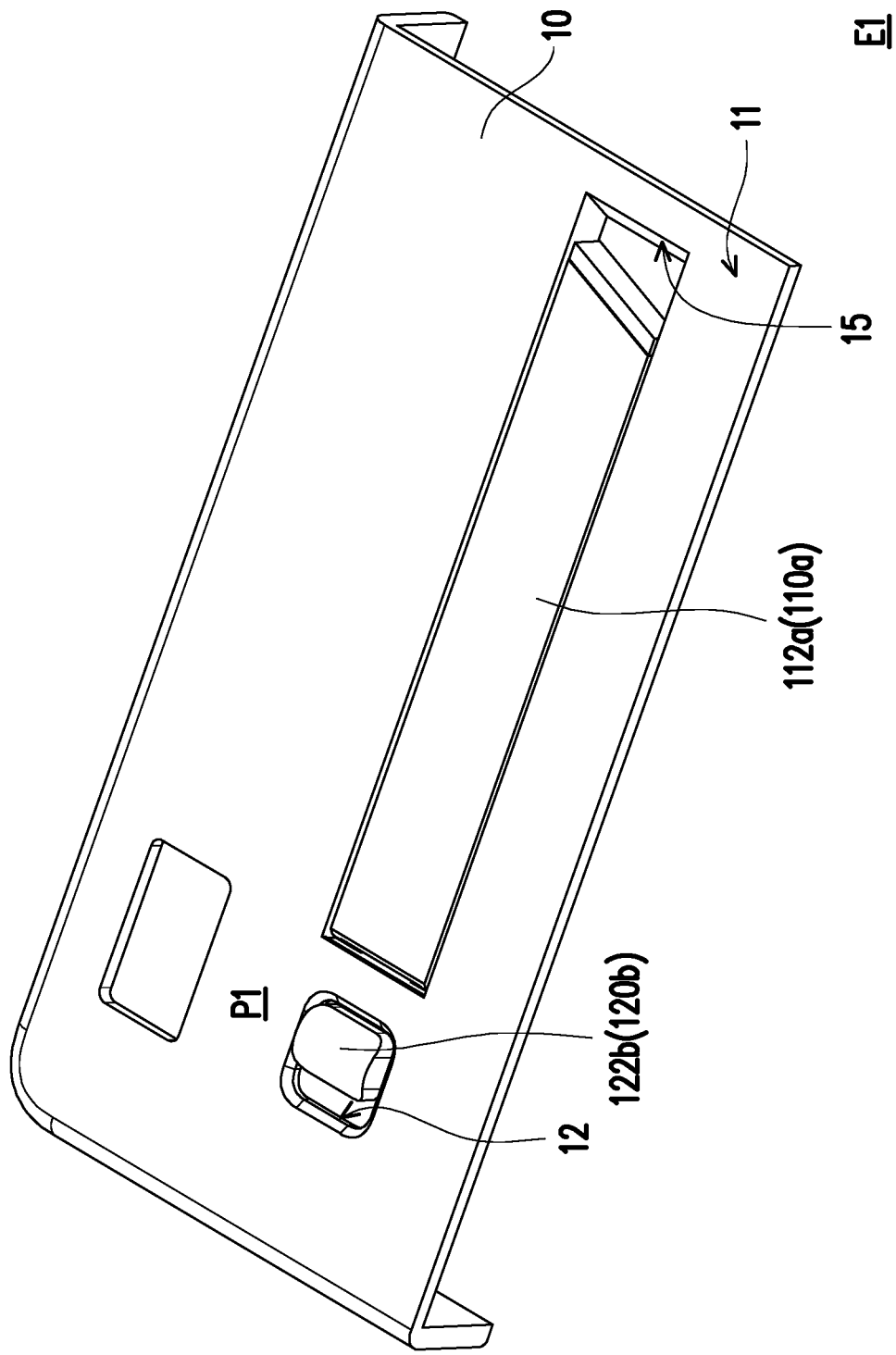
FIG. 2B is a schematic three-dimensional view of the support frame in FIG. 2A in a closed state.
Figure 2C:
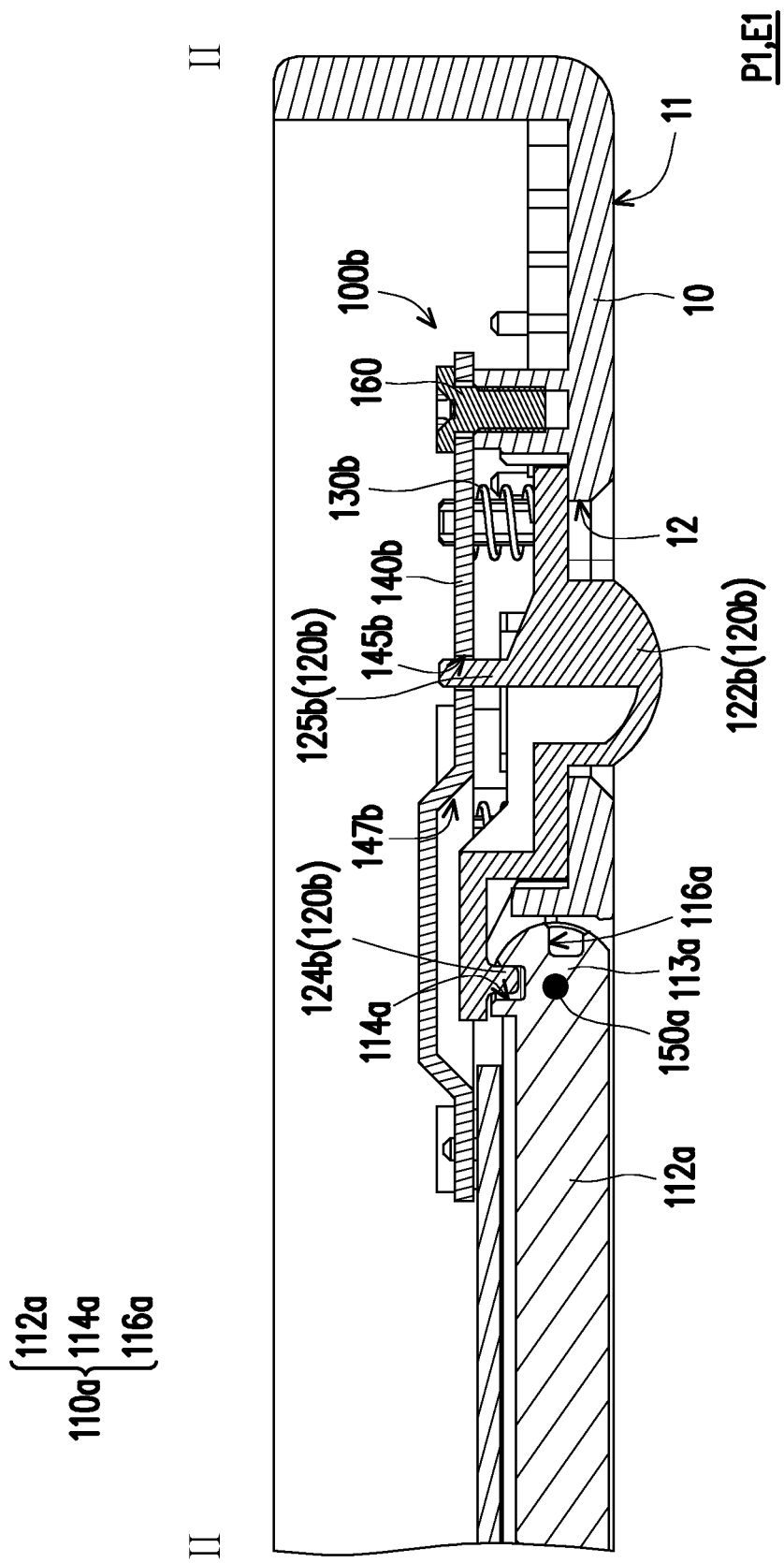
FIG. 2C is a schematic cross-sectional view of the support frame in the closed state along a line II-II in FIG. 2A.
Figure 2D:
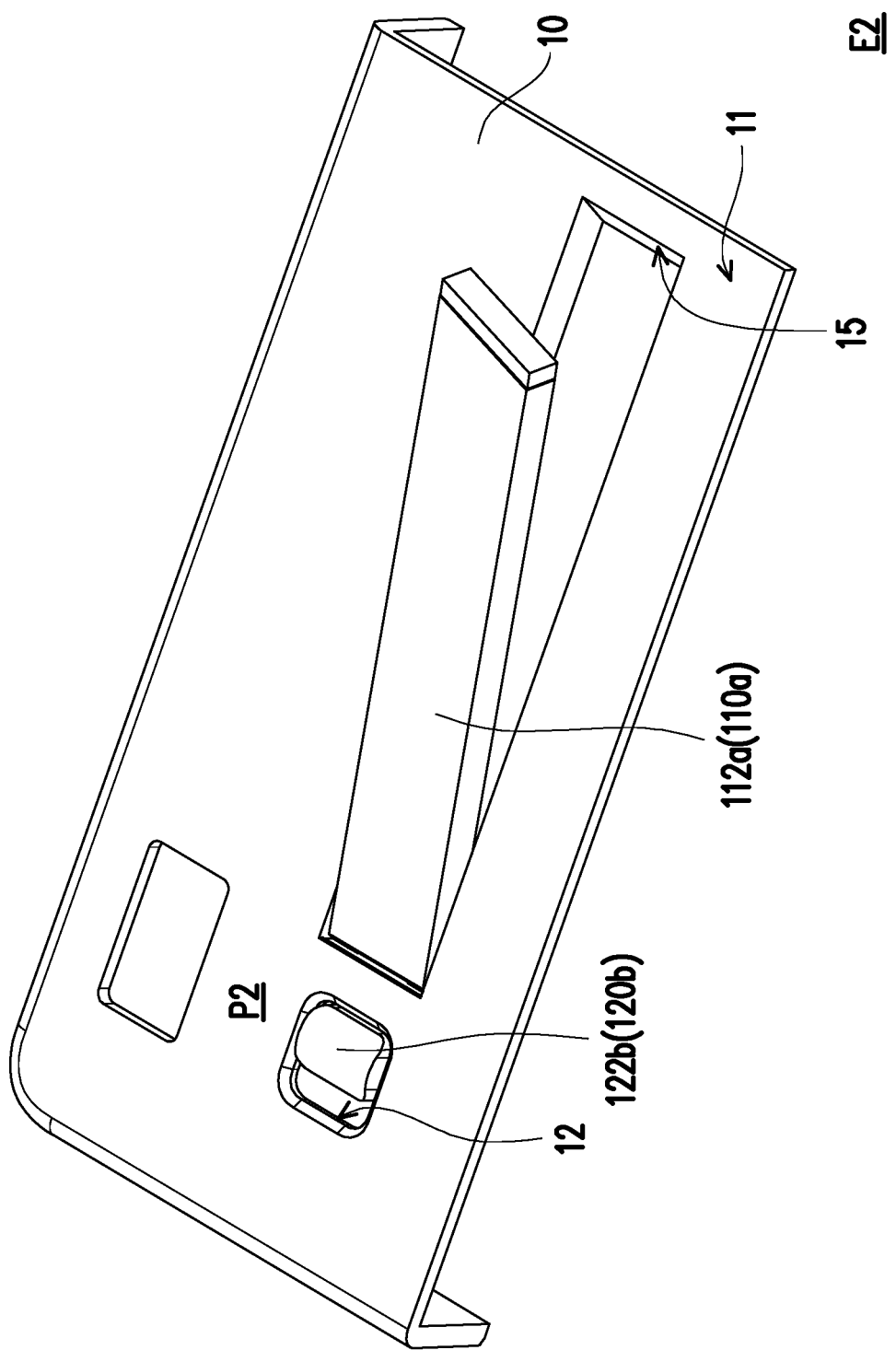
FIG. 2D is a schematic three-dimensional view of the support frame in FIG. 2A in the opening process.
Figure 2E:
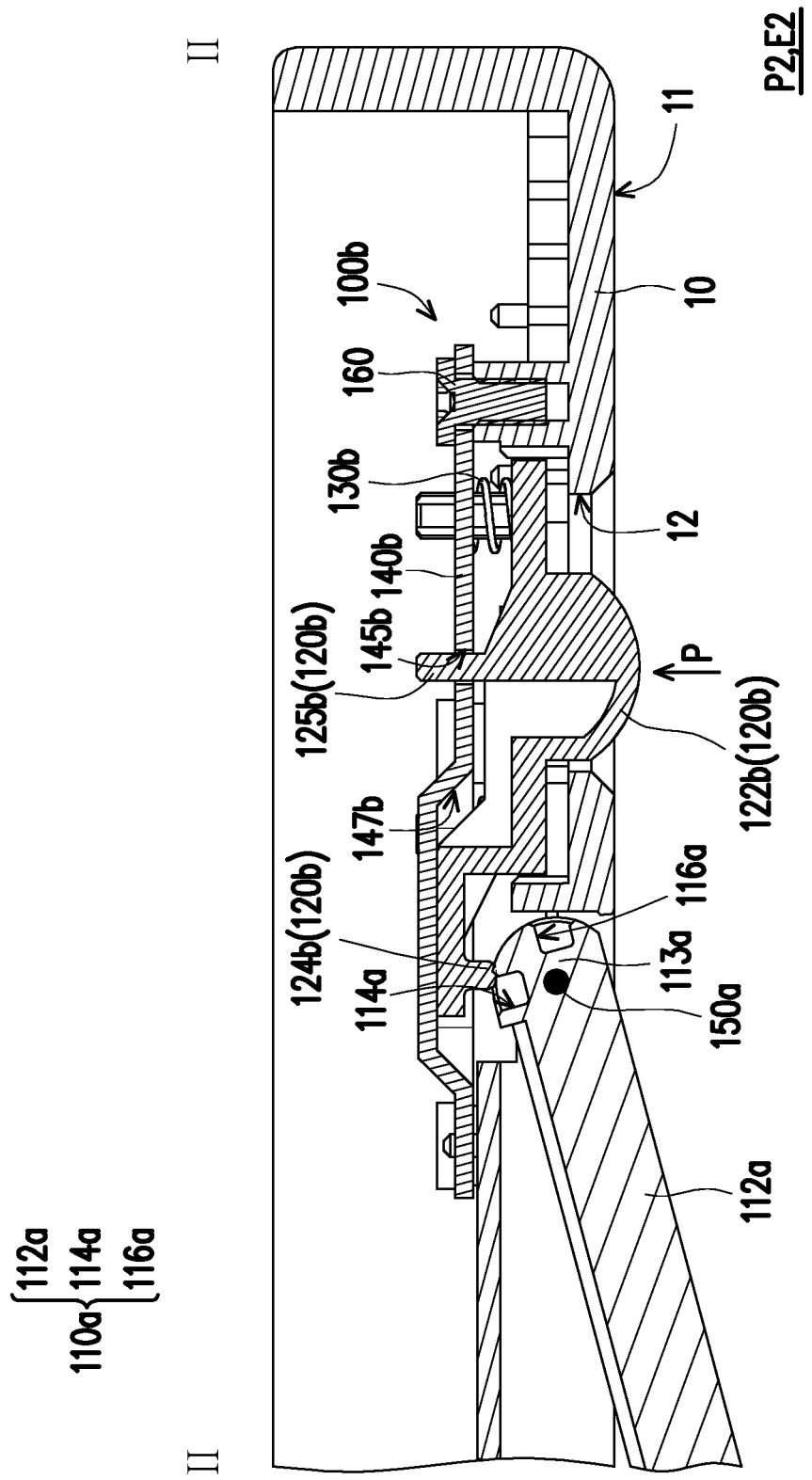
FIG. 2E is a schematic cross-sectional view of the support frame in the opening process along the line II-II in FIG. 2A.
Figure 2F:
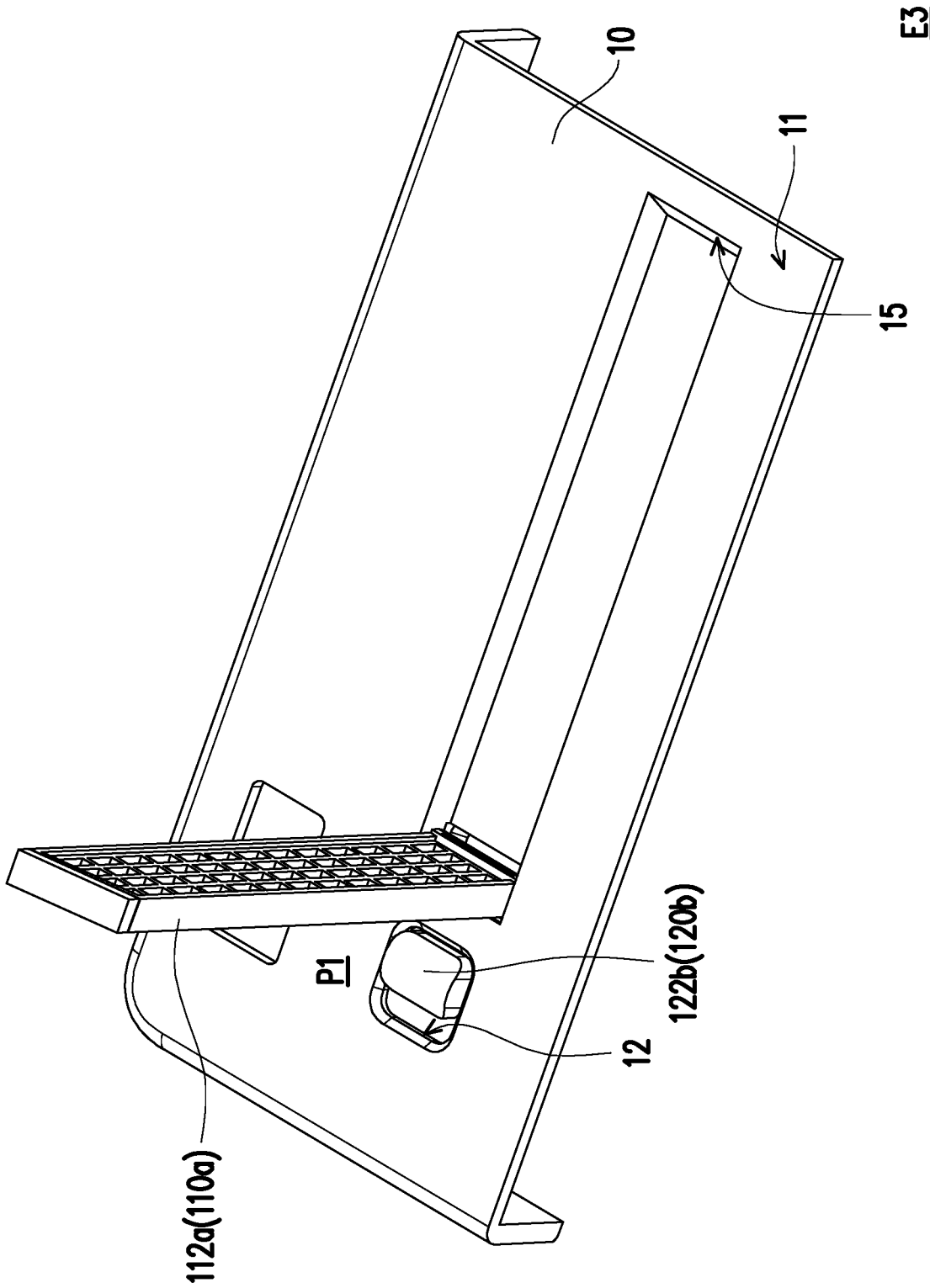
FIG. 2F is a schematic three-dimensional view of the support frame in FIG. 2A in the open state.
Figure 2G:
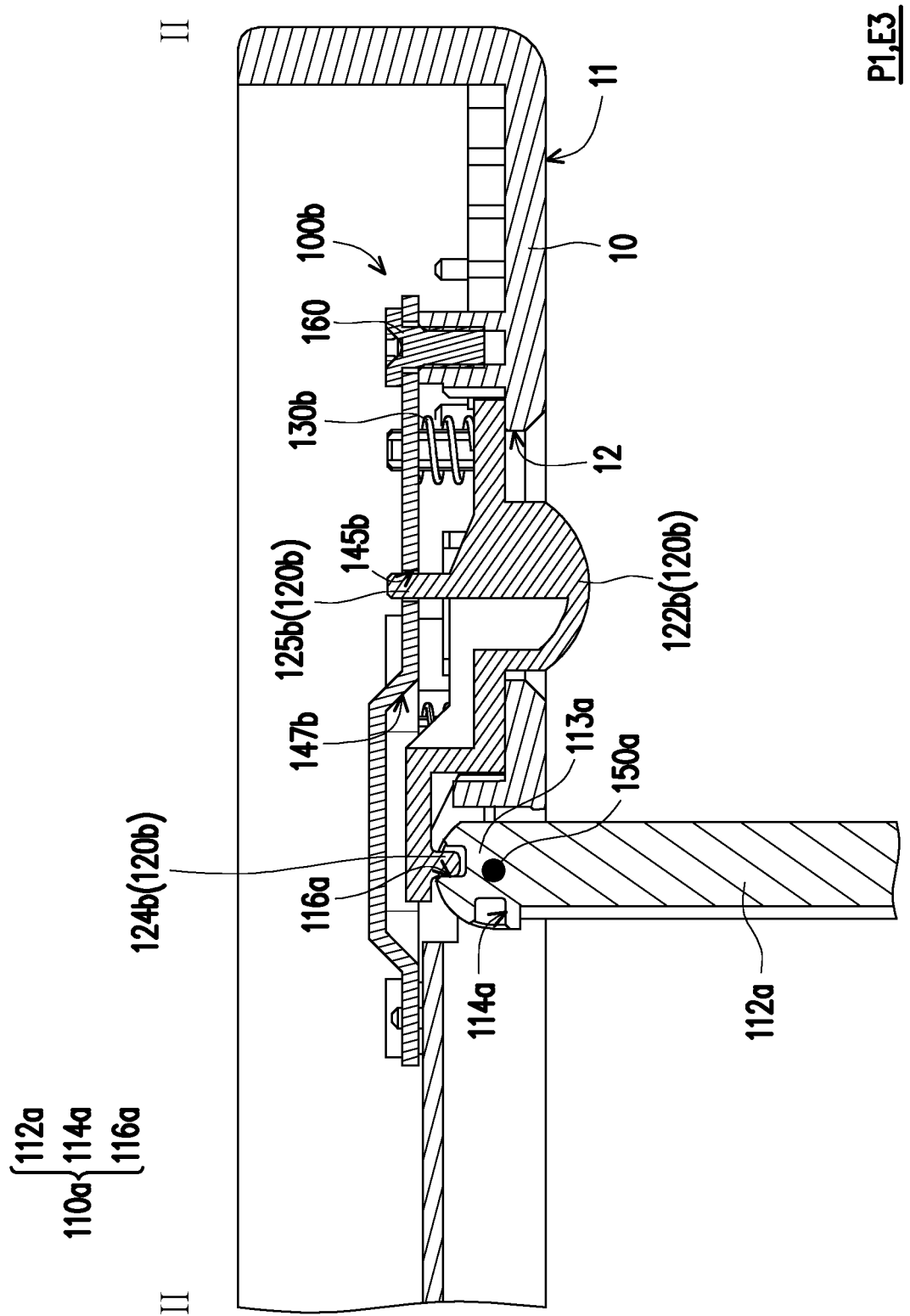
FIG. 2G is a schematic cross-sectional view of the support frame in the open state along the line II-II in FIG. 2A.
Figure 2H:
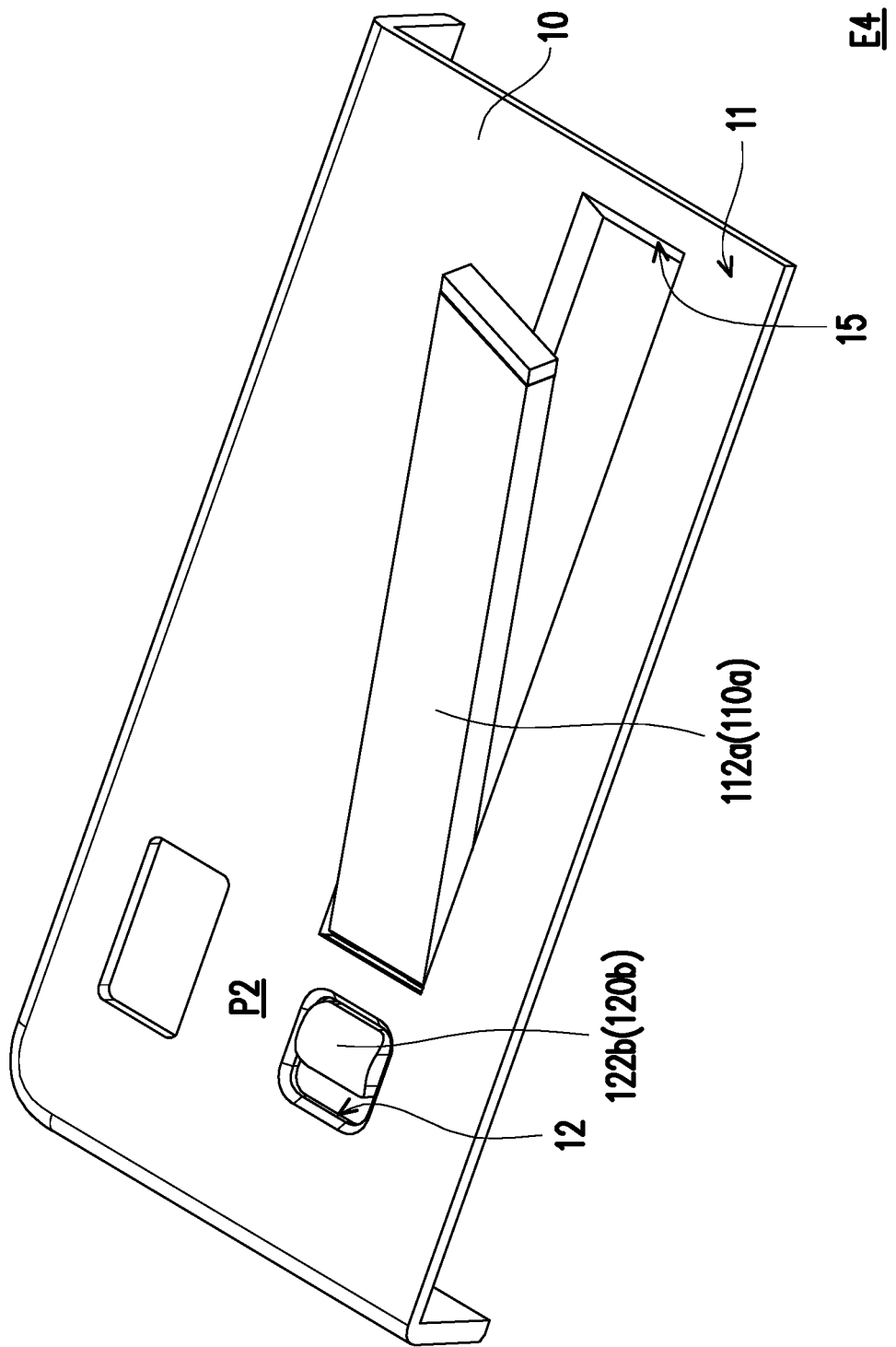
FIG. 2H is a schematic three-dimensional view of the support frame in FIG. 2A in the closing process.
Figure 2I:
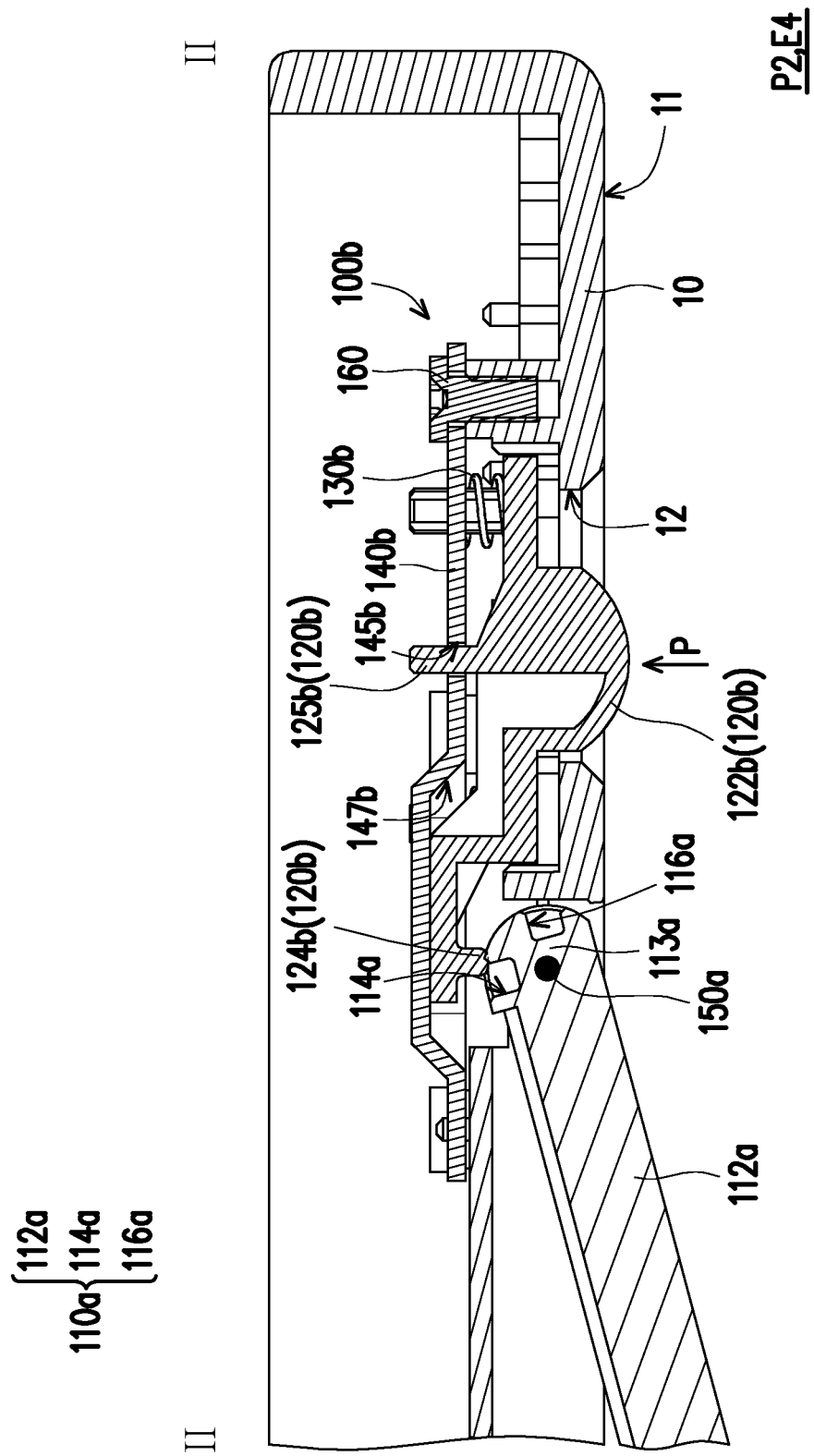
FIG. 2I is a schematic cross-sectional view of the support frame in the closing process along the line II-II in FIG. 2A.

FIG. 2A is a schematic three-dimensional view of a support frame which supports an electronic body according to an embodiment of the disclosure. FIG. 2B is a schematic three-dimensional view of the support frame in FIG. 2A in a closed state. FIG. 2C is a schematic cross-sectional view of the support frame in the closed state along a line II-II in FIG. 2A. FIG. 2D is a schematic three-dimensional view of the support frame in FIG. 2A in the opening process. FIG. 2E is a schematic cross-sectional view of the support frame in the opening process along the line II-II in FIG. 2A. FIG. 2F is a schematic three-dimensional view of the support frame in FIG. 2A in an open state. FIG. 2G is a schematic cross-sectional view of the support frame in the open state along the line II-II in FIG. 2A. FIG. 2H is a schematic three-dimensional view of the support frame in FIG. 2A in a closing process. FIG. 2I is a schematic cross-sectional view of the support frame in the closing process along the line II-II in FIG. 2A. It should be noted that, for convenience of explanation, a cover plate 140b in FIG. 2A is represented by a dotted line.

Please refer to FIG. 1A, FIG. 1C, FIG. 2A, and FIG. 2C at the same time. A support frame 100b of this embodiment is similar to the support frame 100a. The difference between the two is that, in this embodiment, a button 122b of a switch assembly 120b is suitable for moving perpendicular to the back surface 11 within the opening 12, that is, moving perpendicular to the back surface 11 of the electronic body 10 to present the open/closed state, which is a button-type switch that is unlocked by pressing vertically. In addition, the structural design of the cover plate 140b of this embodiment is also different from the structural design of the cover plate 140a of the above embodiment.

In detail, in this embodiment, the cover plate 140b of the support frame 100b is locked in the electronic body 10 and has a limiting hole 145b. The switch assembly 120b further includes a limiting column 125b, in which the limiting column 125b, a cam 124b, and the button 122b are embodied as integrally formed. The limiting column 125b of the switch assembly 120b is movably sleeved in the limiting hole 145b, so that the cam 124b of the switch assembly 120b is removably inserted into the first cavity 114a or the second cavity 116a of the movable element 110a. That is to say, the combination of the limiting hole 145b and the limiting column 125b can guide the switch assembly 120b to move vertically, which ensures a smooth actuation and a good hand feel. It should be noted that, the disposition of the limiting hole 145b affects the disposition of an elastic element 130b, and different reset forces (i.e., pressing forces) may be achieved through different dispositions. Moreover, the cover plate 140b of this embodiment further includes a limiting cavity 147b disposed corresponding to the cam 124b, which can limit the movement of the switch assembly 120b within the opening 12. In addition, the elastic element 130b of this embodiment is perpendicular to the electronic body 10 and disposed between the switch assembly 120b and the electronic body 10. Here, the elastic element 130b is, for example, a spring, and the quantity is embodied as four, but not limited thereto.

Next, please refer to FIG. 2B and FIG. 2C at the same time. In this embodiment, when the support frame 100b is in the closed state E1, the elastic element 130b pushes the switch assembly 120b, so that the switch assembly 120a is in the first position P1. At this time, the cam 124b of the switch assembly 120b is inserted into the first cavity 114a of the movable element 110a, which can limit the rotation of the movable element 110a relative to the electronic body 10. That is to say, the movable element 110a can be fixed and contained in the containing cavity 15 of the electronic body 10 and cannot be rotated and automatically opened, which can prevent the movable element 110a from automatically opening in the closed state E1.

Next, please refer to FIG. 2D and FIG. 2E at the same time. When the support frame 100b is in the opening process E2, the user uses one hand to push the switch assembly 120b along a perpendicular direction P perpendicular to the back surface 11 of the electronic body 10, so that the switch assembly 120b linearly moves to the second position P2 by resisting the elastic force of the elastic element 130b. At this time, the limiting cavity 147b of the cover plate 140b can limit the movement of the switch assembly 120b within the opening 12, and the movable element 110a lacks the stop of the cam 124b, so that the user can use the other hand to open the movable element 110a (that is, to provide a hand feel), so that the movable element 110a can rotate relative to the electronic body 10 and gradually expand from the electronic body 10.

Afterward, please refer to FIG. 2F and FIG. 2G at the same time. When the support frame 100b is in the open state E3, the elastic element 130b pushes the switch assembly 120b, so that the switch assembly 120b is in the first position P1 again. At this time, the cam 124b of the switch assembly 120b is inserted into the second cavity 116a of the movable element 110a, which can limit the rotation of the movable element 110a relative to the electronic body 10. That is to say, the movable element 110a can be fixed and expanded from the electronic body 10 to support the electronic body 10 and cannot be rotated and automatically closed, which can prevent the movable element 110a from automatically closing when in the open state E3.

Finally, please refer to FIG. 2H and FIG. 2I at the same time. When the support frame 100b is in the closing process E4, the user uses one hand to push the switch assembly 120b along the perpendicular direction P, so that the switch assembly 120b linearly moves to the second position P2 by resisting the elastic force of the elastic element 130b. At this time, the limiting cavity 147b of the cover plate 140b can limit the movement of the switch assembly 120b within the opening 12, the movable element 110a lacks the stop of the cam 124b, and the user can use the other hand to close the movable element 110a (that is, to provide a hand feel), so that the movable element 110a can rotate relative to the electronic body 10 and gradually close in the containing cavity 15 of the electronic body 10. That is to say, the support frame 100b of this embodiment can expand or close through operating the movable element 110a with both hands.

In the design of the support frame 100b of this embodiment, when the elastic element 130b pushes the switch assembly 120b so that the switch assembly 120b is in the first position P1, the cam 124b is inserted into the first cavity 114a or the second cavity 116a of the movable element 110a to limit the rotation of the movable element 110a relative to the electronic body 10. When the switch assembly 120b linearly moves to the second position P2 by resisting the elastic force of the elastic element 130b, the movable element 110a rotates relative to the electronic body 10 to expand or close to the electronic body 10. That is to say, in the support frame 100b of this embodiment, the movable element 110a can be fixed in a specific expanded or closed position through the elastic element 130b accumulating and releasing the mechanical energy, and since the cam 124b can be inserted into the first cavity 114a or the second cavity 116a of the movable element 110a, not only can a great strength be provided to meet the usage scenario, but also a thin effect can be achieved. In addition, the position of the switch assembly 120b and the position of the movable element 110a are staggered in the thickness direction, in which the switch assembly 120b is positioned behind the movable element 110a, so that the thin effect can be achieved in terms of the overall thickness of the support frame 100b. In short, the support frame 100b of this embodiment can achieve the purpose of being small and thin in size and low in cost.

Figure 3A:
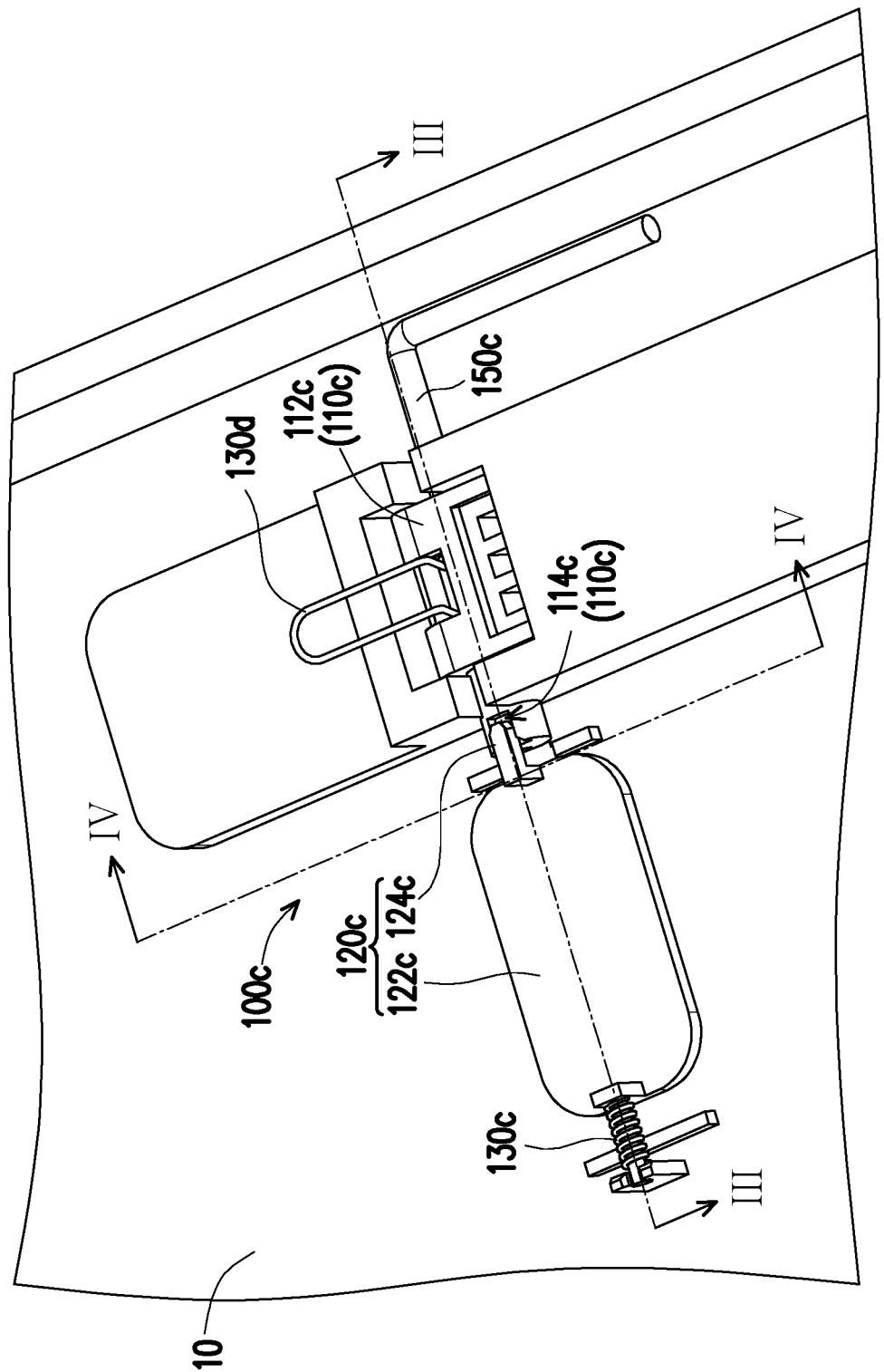
FIG. 3A is a schematic three-dimensional view of a support frame which supports an electronic body according to an embodiment of the disclosure.
Figure 3B:
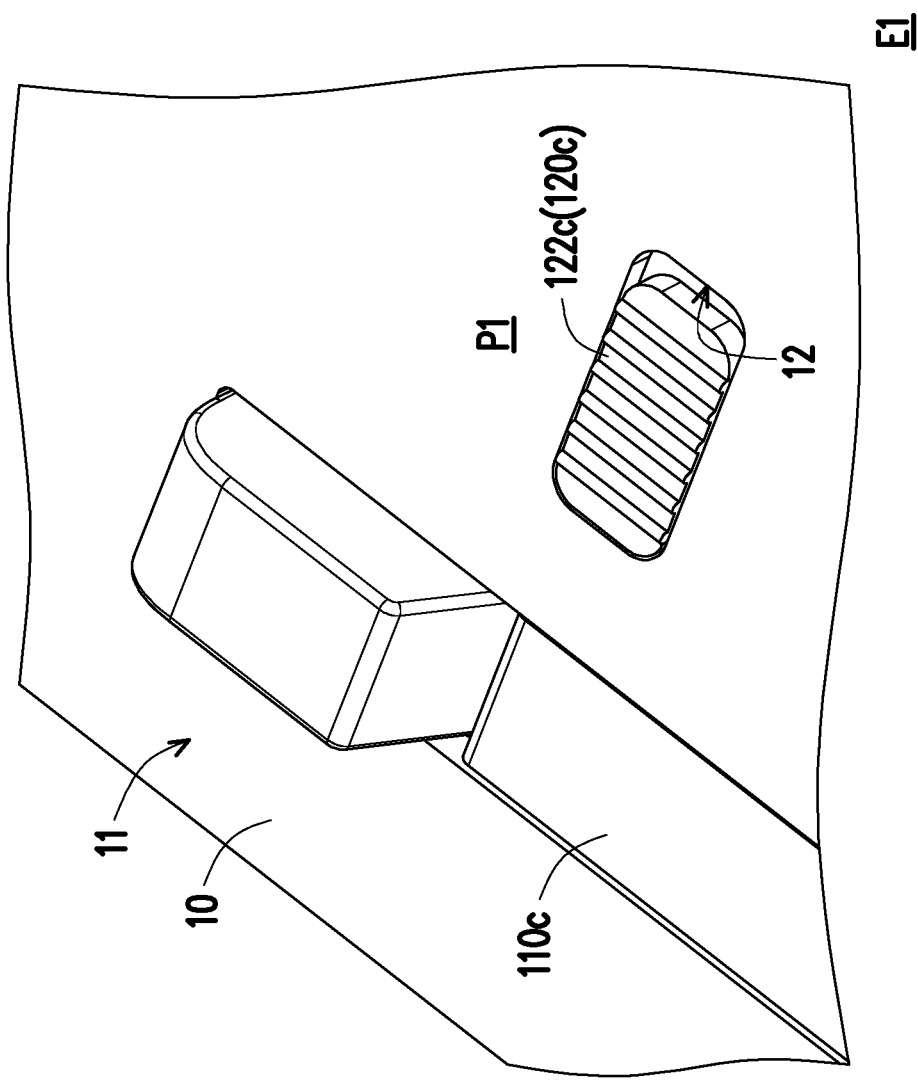
FIG. 3B is a schematic three-dimensional view of the support frame in FIG. 3A in a closed state.
Figure 3C:
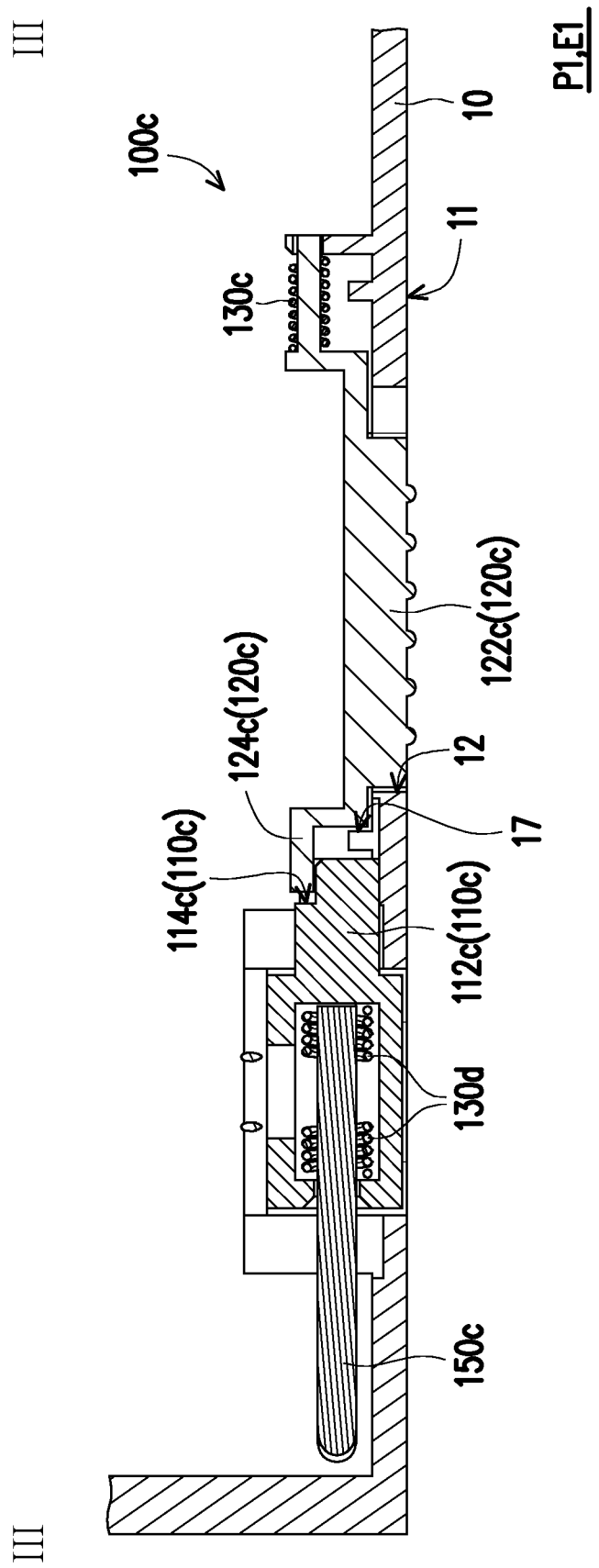
FIG. 3C is a schematic cross-sectional view of the support frame in the closed state along a line III-III in FIG. 3A.
Figure 3D:
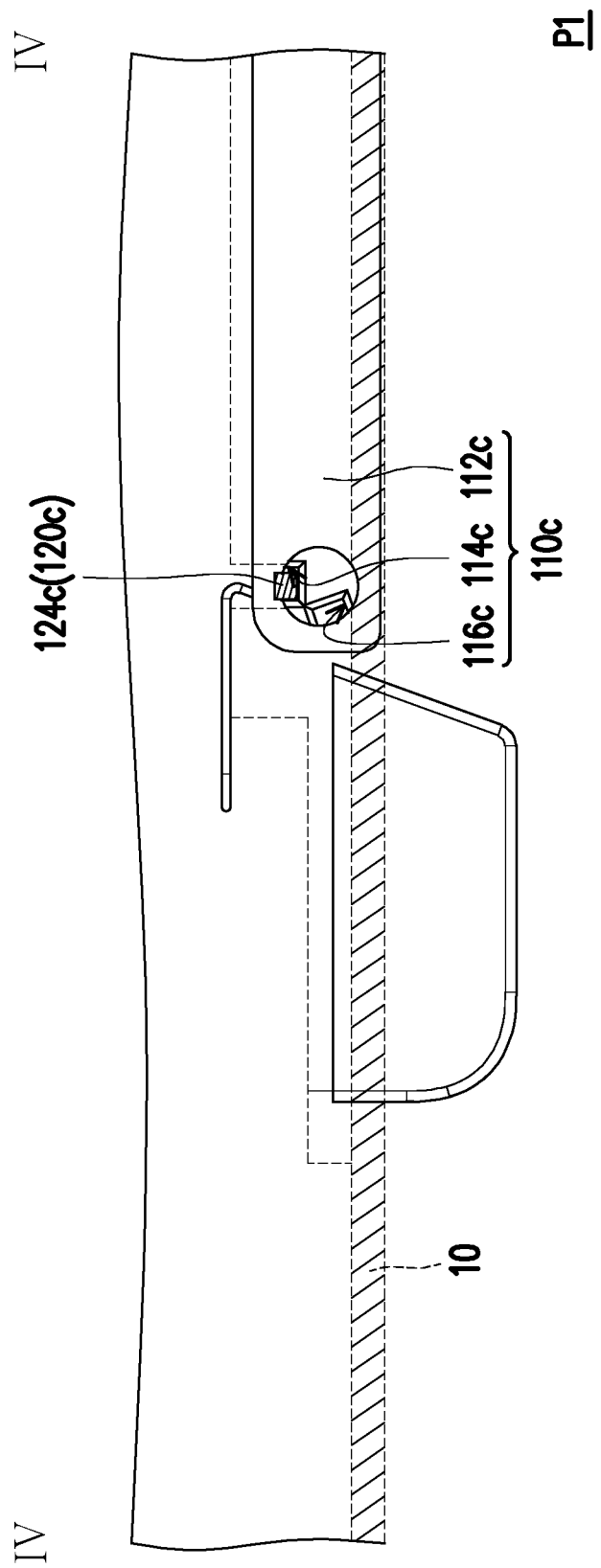
FIG. 3D is a schematic cross-sectional view of the support frame in the closed state along a line IV-IV in FIG. 3A.
Figure 3E:
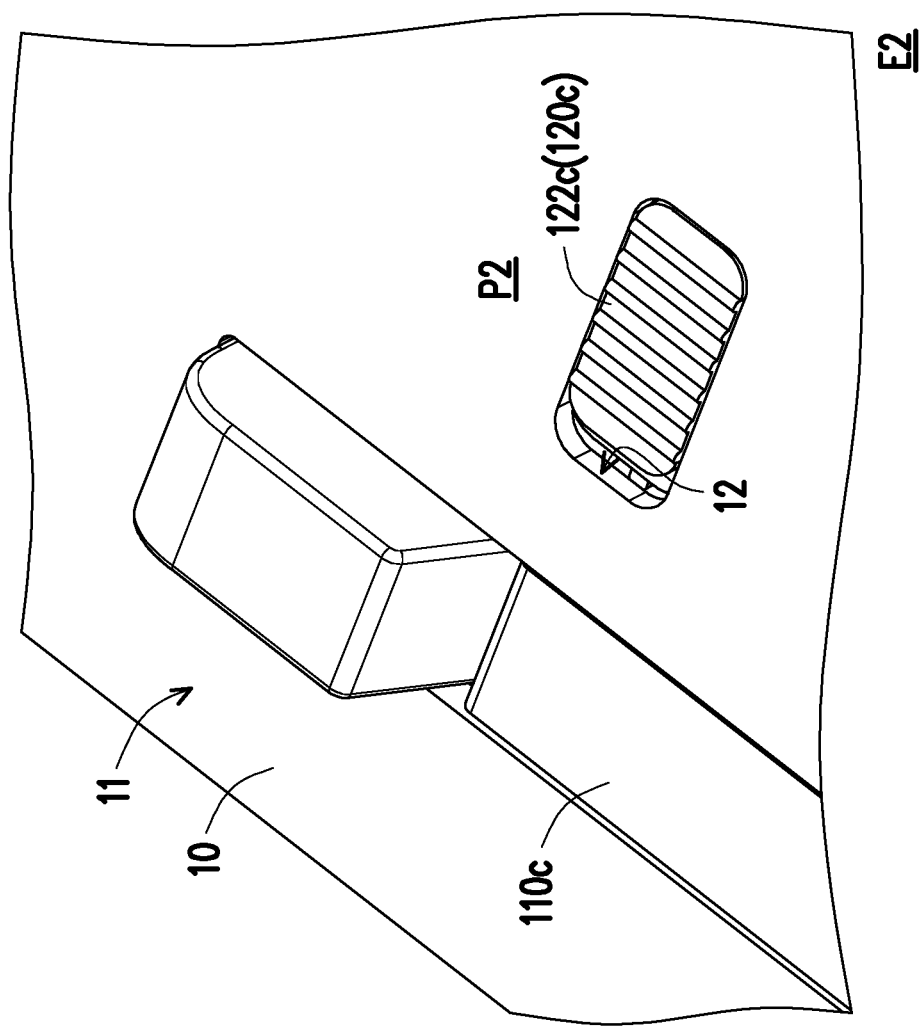
FIG. 3E is a schematic three-dimensional view of the support frame in FIG. 3A in the opening process.
Figure 3F:
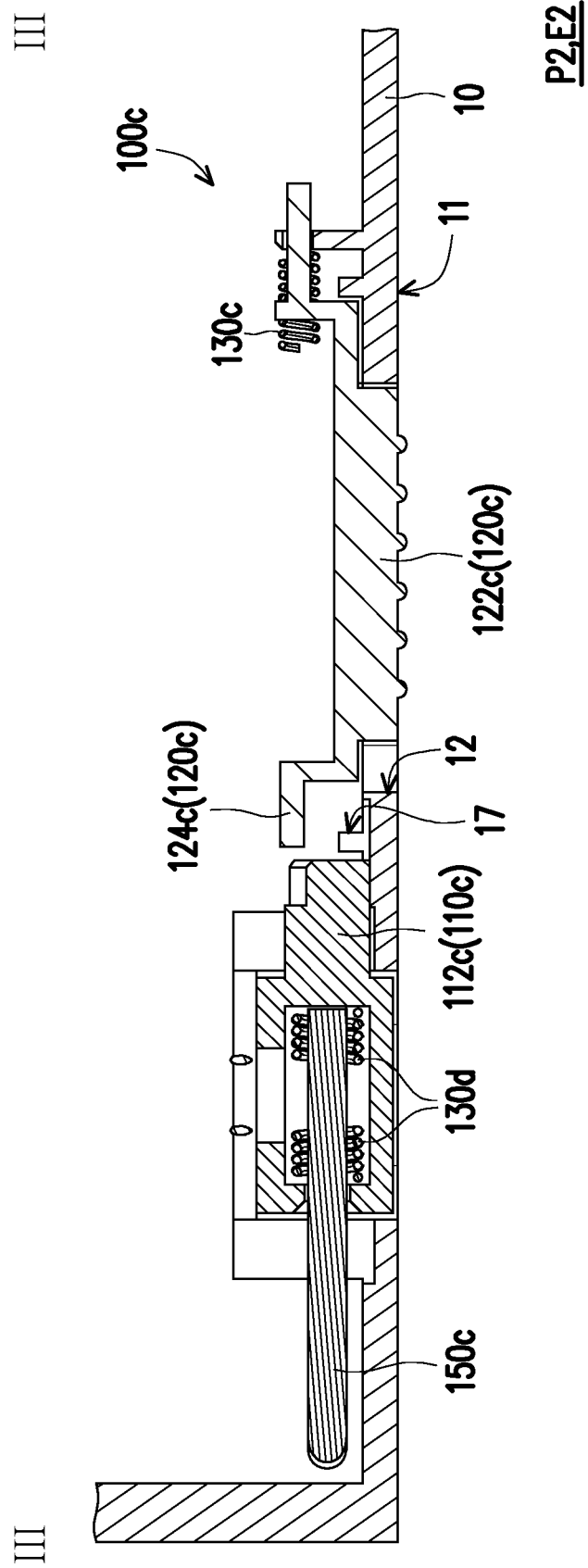
FIG. 3F is a schematic cross-sectional view of the support frame in the opening process along the line III-III in FIG. 3A.
Figure 3G:
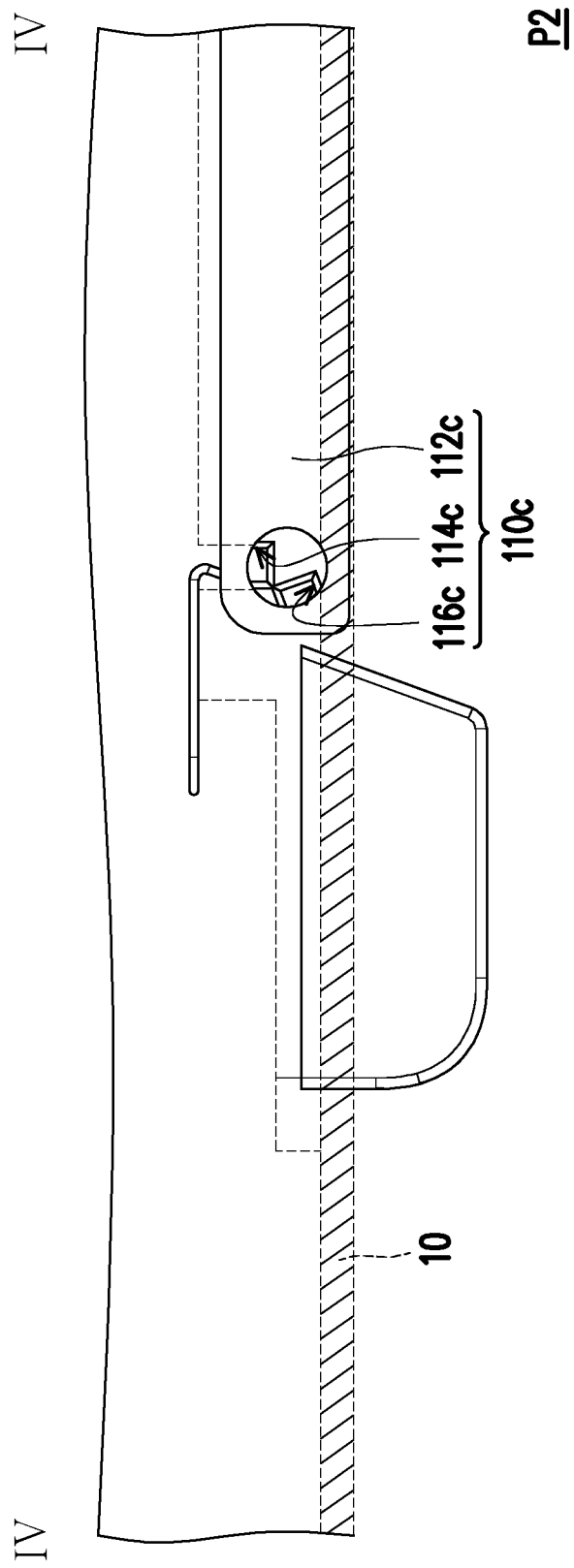
FIG. 3G is a schematic cross-sectional view of the support frame in the opening process along the line IV-IV in FIG. 3A.
Figure 3H:
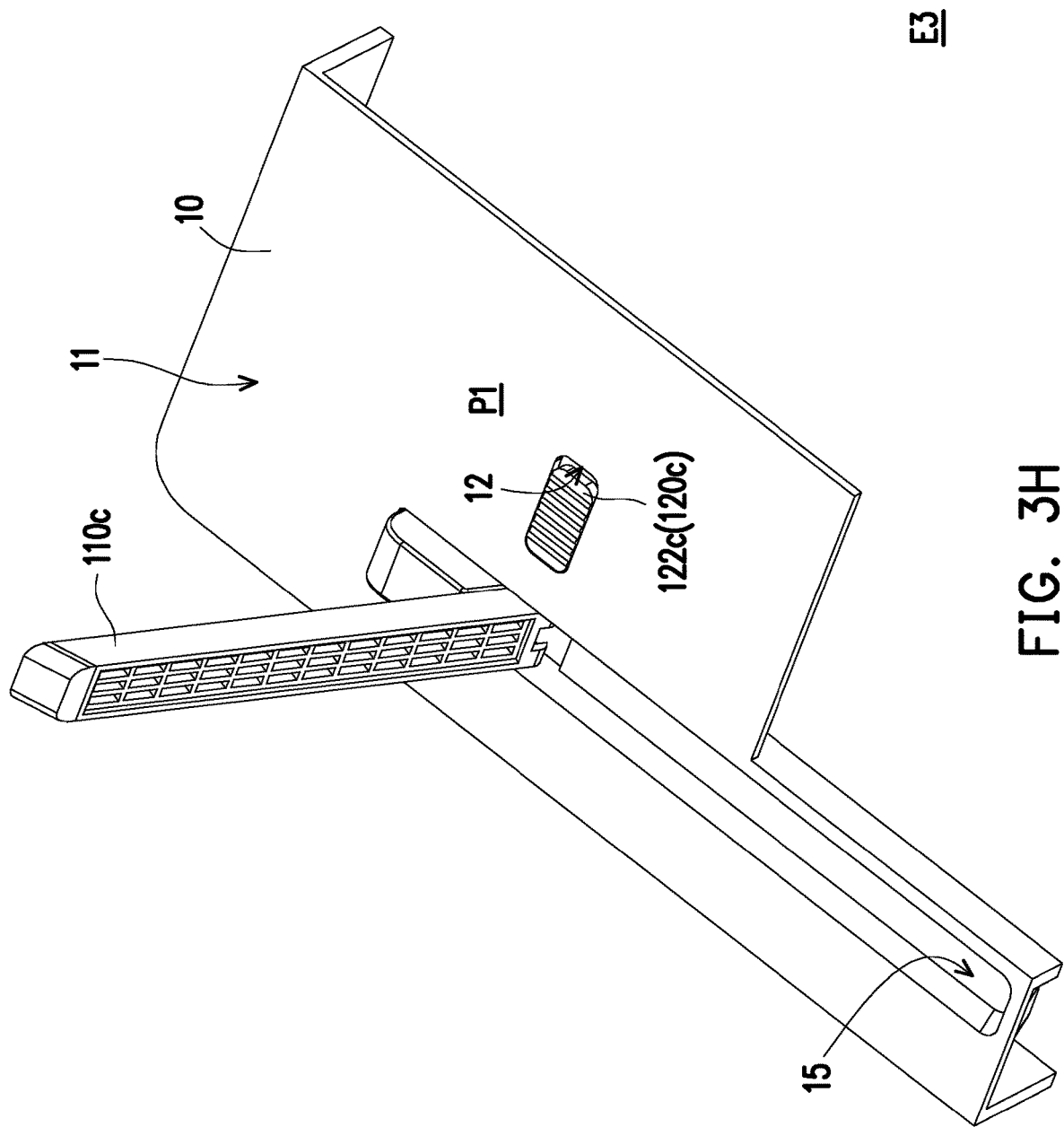
FIG. 3H is a schematic three-dimensional view of the support frame in FIG. 3A in an open state.
Figure 3I:
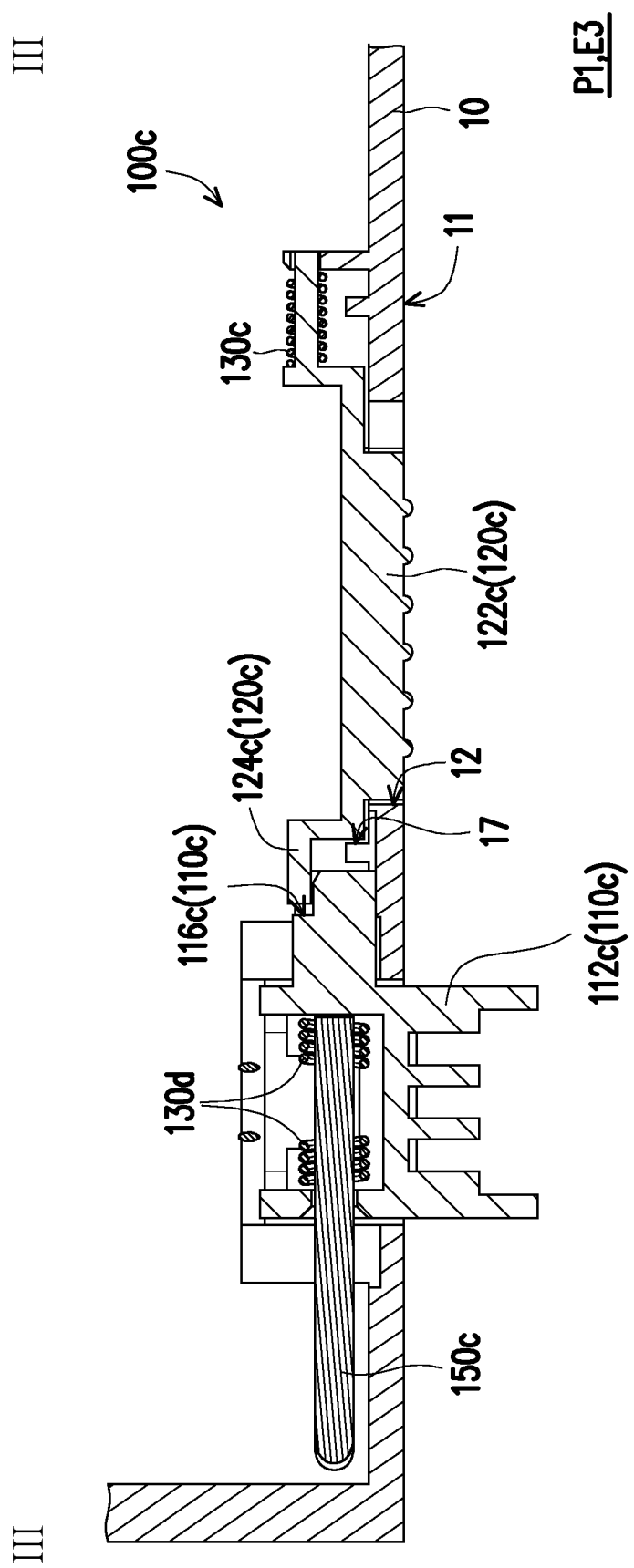
FIG. 3I is a schematic cross-sectional view of the support frame in the open state along the line III-III in FIG. 3A.
Figure 3J:
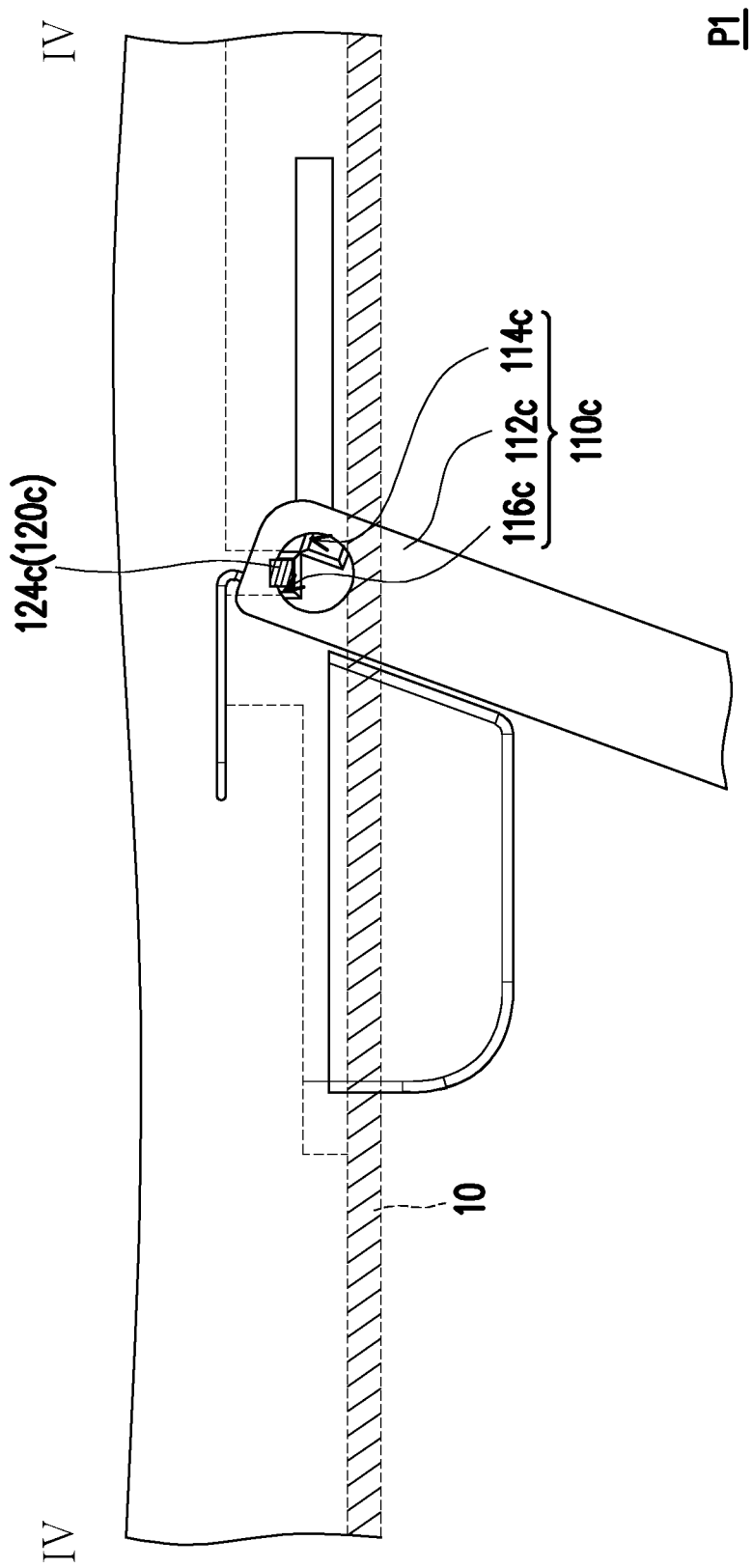
FIG. 3J is a schematic cross-sectional view of the support frame in the open state along the line IV-IV in FIG. 3A.
Figure 3K:
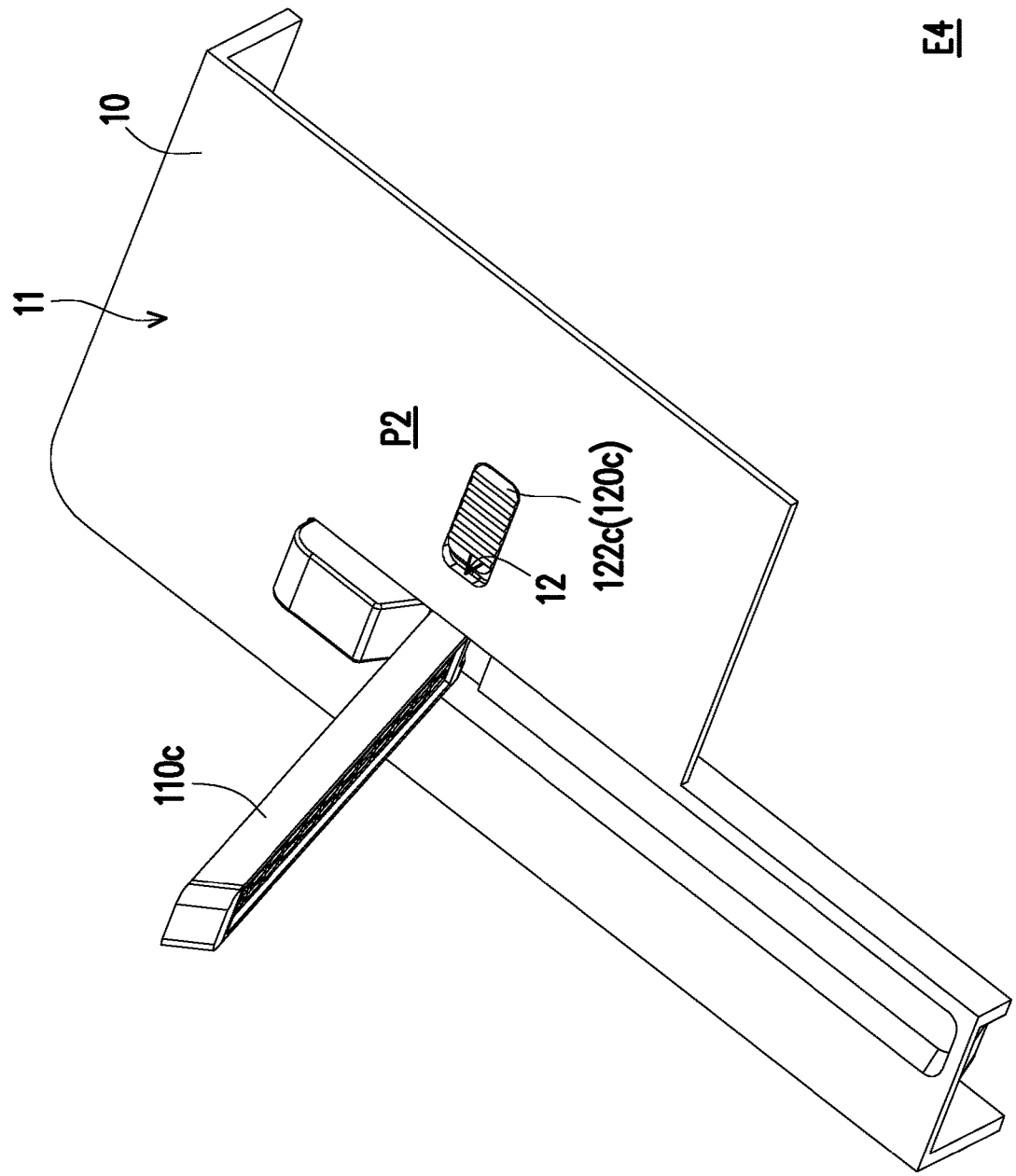
FIG. 3K is a schematic three-dimensional view of the support frame in FIG. 3A in the closing process.
Figure 3L:
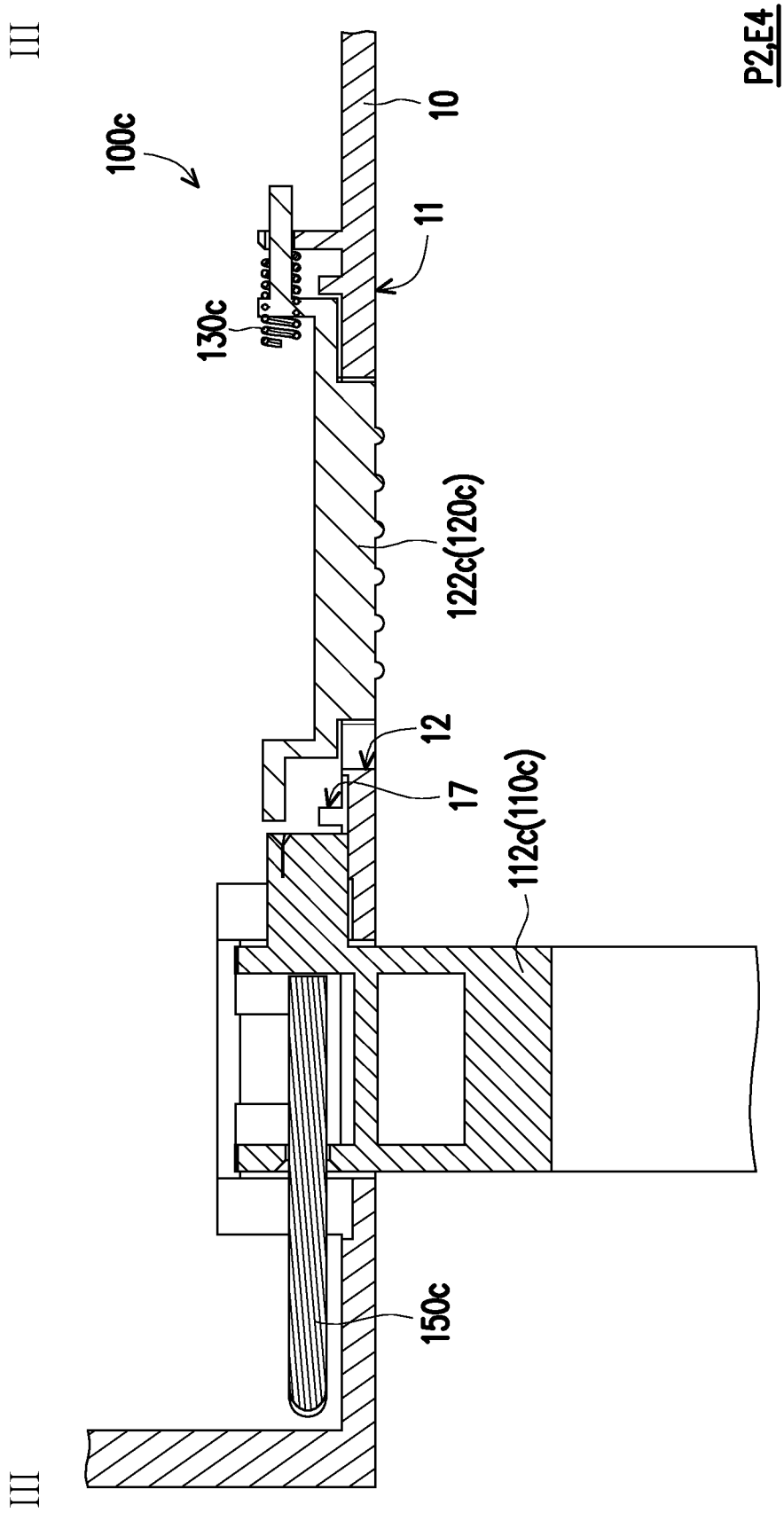
FIG. 3L is a schematic cross-sectional view of the support frame in the closing process along the line III-III in FIG. 3A.
Figure 3M:
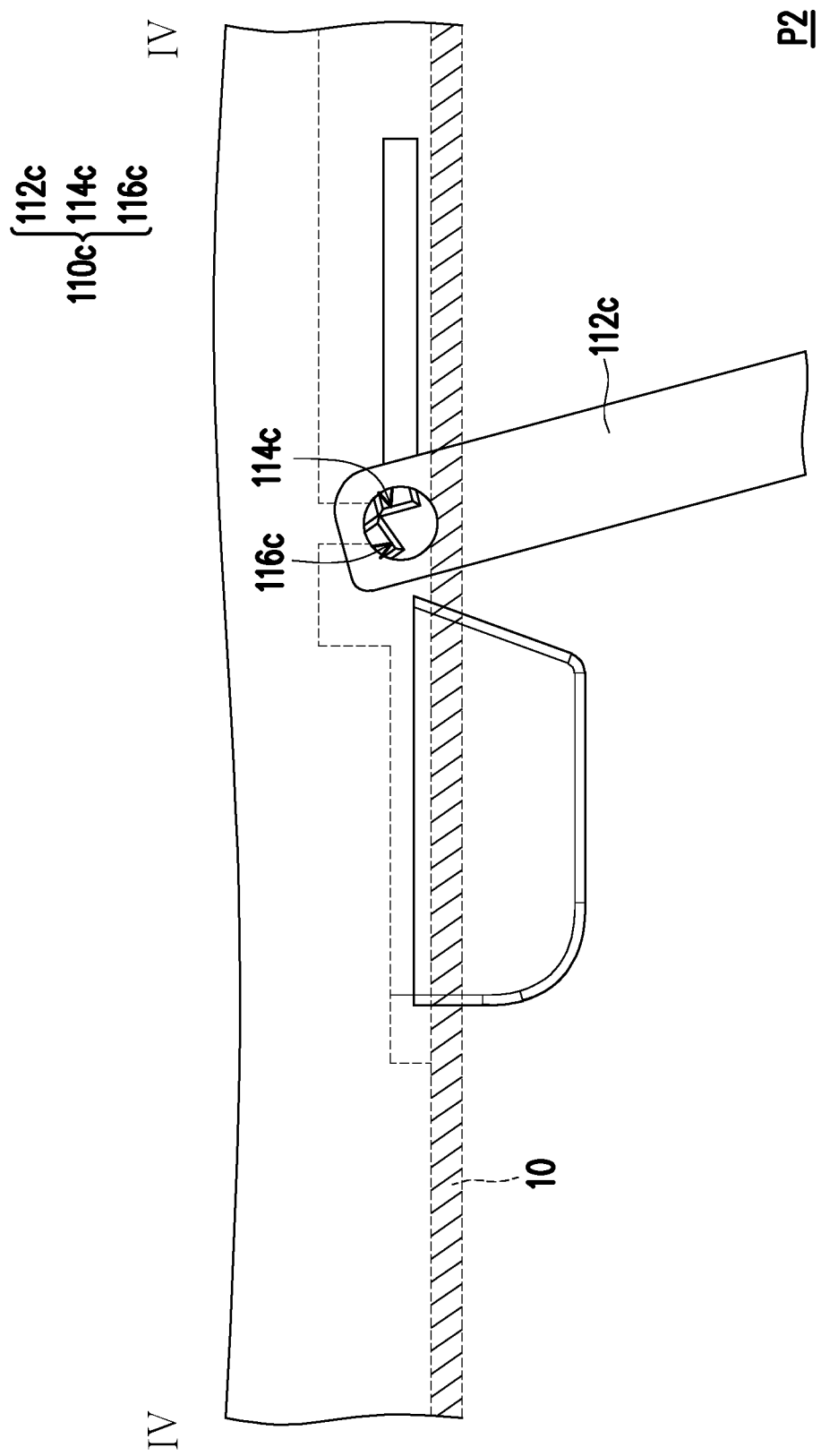
FIG. 3M is a schematic cross-sectional view of the support frame in the closing process along the line IV-IV in FIG. 3A.

FIG. 3A is a schematic three-dimensional view of a support frame which supports an electronic body according to an embodiment of the disclosure. FIG. 3B is a schematic three-dimensional view of the support frame in FIG. 3A in a closed state. FIG. 3C is a schematic cross-sectional view of the support frame in the closed state along a line III-III in FIG. 3A. FIG. 3D is a schematic cross-sectional view of the support frame in the closed state along a line IV-IV in FIG. 3A. FIG. 3E is a schematic three-dimensional view of the support frame in FIG. 3A in the opening process. FIG. 3F is a schematic cross-sectional view of the support frame in the opening process along the line III-III in FIG. 3A. FIG. 3G is a schematic cross-sectional view of the support frame in the opening process along the line IV-IV in FIG. 3A. FIG. 3H is a schematic three-dimensional view of the support frame in FIG. 3A in an open state. FIG. 3I is a schematic cross-sectional view of the support frame in the open state along the line III-III in FIG. 3A. FIG. 3J is a schematic cross-sectional view of the support frame in the open state along the line IV-IV in FIG. 3A. FIG. 3K is a schematic three-dimensional view of the support frame in FIG. 3A in a closing process. FIG. 3L is a schematic cross-sectional view of the support frame in the closing process along the line III-III in FIG. 3A. FIG. 3M is a schematic cross-sectional view of the support frame in the closing process along the line IV-IV in FIG. 3A.

Please refer to FIG. 1A, FIG. 1C, FIG. 3A, and FIG. 3C at the same time. A support frame 100c of this embodiment is similar to the support frame 100a. The difference between the two is that, in this embodiment, the elastic element includes a first elastic element 130c and a second elastic element 130d, and the elastic forces include a first elastic force and a second elastic force. The first elastic element 130c has the first elastic force and is connected between a switch assembly 120c and the electronic body 10, in which the first elastic element 130c is embodied as a spring. The second elastic element 130d has the second elastic force and is connected to a movable element 110c, in which the second elastic element 130d is embodied as a torsion spring. The first elastic element 130c and the second elastic element 130d are pivoted on the same axis, and the directions where the first elastic force and the second elastic force act are perpendicular to each other. Moreover, in this embodiment, the electronic body 10 further includes a limiting cavity 17, in which the switch assembly 120c is born within the limiting cavity 17, and the limiting cavity 17 limits the movement of the switch assembly 120c within the opening 12. In addition, the movable element 110c includes a body 112c, a first cavity 114c, and a second cavity 116c, and the switch assembly 120c includes a button 122c and a cam 124c. A rotation shaft 150c is connected to the electronic body 10 and passes through the movable element 110c, in which the movable element 110c rotates relative to the electronic body 10 with the rotation shaft 150c as the axis.

Next, please refer to FIG. 3B, FIG. 3C, and FIG. 3D at the same time. In this embodiment, when the support frame 100c is in the closed state E1, the first elastic force of the first elastic element 130c pushes the switch assembly 120c, so that the switch assembly 120c is in the first position P1. At this time, the cam 124c of the switch assembly 120c is inserted into the first cavity 114c of the movable element 110c, which can limit the rotation of the movable element 110c relative to the electronic body 10. That is to say, the movable element 110c cannot be rotated and automatically opened, which can prevent the movable element 110c from automatically opening in the closed state E1.

Next, please refer to FIG. 3E, FIG. 3F, and FIG. 3G at the same time. When the support frame 100c is in the opening process E2, the user uses one hand to push the switch assembly 120c, so that the switch assembly 120c linearly moves to the second position P2 by resisting the first elastic force of the first elastic element 130c. At this time, due to lacking the stop of the cam 124c, the movable element 110c is automatically opened by the second elastic force of the second elastic element 130d, so that the movable element 110c can rotate relative to the electronic body 10 and gradually expand from the electronic body 10. That is to say, this embodiment may be regarded as a torsion spring-type folding support frame that automatically opens.

Afterward, please refer to FIG. 3H, FIG. 3I, and FIG. 3J at the same time. When the support frame 100c is in the open state E3, the first elastic element 130c provides the first elastic force to push the switch assembly 120c again, so that the switch assembly 120c is in the first position P1 again. At this time, the cam 124c of the switch assembly 120c is inserted into the second cavity 116c of the movable element 110c, which can limit the rotation of the movable element 110c relative to the electronic body 10. That is to say, the movable element 110c can be fixed and expanded from the electronic body 10 to support the electronic body 10 and cannot be rotated and automatically closed, which can prevent the movable element 110c from automatically closing when in the open state E3.

Finally, please refer to FIG. 3K, FIG. 3L, and FIG. 3M at the same time. When the support frame 100c is in the closing process E4, the user uses one hand to push the switch assembly 120c, so that the switch assembly 120c linearly moves to the second position P2 by resisting the first elastic force of the first elastic element 130c. At this time, since the movable element 110c lacks the stop of the cam 124c, the user may close the movable element 110c with one hand, so that the movable element 110c can rotate relative to the electronic body 10 and gradually close in the containing cavity 15 of the electronic body 10. That is to say, the support frame 100c of this embodiment can expand or close through operating the movable element 110c with one hand.

In the design of the support frame 100c of this embodiment, when the first elastic element 130c pushes the switch assembly 120c so that the switch assembly 120c is in the first position P1, the cam 124c is inserted into the first cavity 114c or the second cavity 116c of the movable element 110c to limit the rotation of the movable element 110c relative to the electronic body 10. When the switch assembly 120c linearly moves to the second position P2 by resisting the first elastic force of the first elastic element 130c, the movable element 110c rotates relative to the electronic body 10 to expand or close to the electronic body 10. That is to say, in the support frame 100c of this embodiment, the movable element 110c can be fixed in a specific expanded or closed position through the first elastic element 130c accumulating and releasing the mechanical energy, and since the cam 124c can be inserted into the first cavity 114c or the second cavity 116c of the movable element 110c, not only can a great strength be provided to meet the usage scenario, but also a thin effect can be achieved. In addition, the position of the switch assembly 120c and the position of the movable element 110c are staggered in the thickness direction, in which the switch assembly 120c is positioned on a lateral side of the movable element 110c, so that the thin effect can be achieved in terms of the overall thickness of the support frame 100a. In short, the support frame 100c of this embodiment can achieve the purpose of being small and thin in size and low in cost.

In summary, in the design of the support frame according to the disclosure, when the elastic element pushes the switch assembly so that the switch assembly is in the first position, the cam is inserted into the first cavity or the second cavity of the movable element to limit the rotation of the movable element relative to the electronic body. When the switch assembly linearly moves to the second position by resisting the elastic force of the elastic element, the movable element rotates relative to the electronic body to expand or close to the electronic body. That is to say, in the support frame according to the disclosure, the movable element can be fixed in a specific expanded or closed position through the elastic element accumulating and releasing the mechanical energy, thereby achieving the purpose of being small in size and low in cost.

Although the disclosure has been disclosed by the embodiments, the embodiments are not intended to limit the disclosure. Persons with ordinary knowledge in the technical field may make some changes and modifications without departing from the spirit and scope of the disclosure. Therefore, the scope of protection of the disclosure shall be determined by the appended claims.

What is claimed is:

1. A support frame suitable for supporting an electronic body, wherein the support frame comprises:
   a movable element comprising a body, a first cavity, and a second cavity, wherein the first cavity and the second cavity are separated from each other and positioned on a terminal portion of the body, and the terminal portion is pivotally connected to the electronic body and positioned in the electronic body;
   a switch assembly comprising a button and a cam, wherein the button is exposed on the electronic body, and the cam is positioned in the electronic body; and
   at least one elastic element disposed in the electronic body and at least connected between the switch assembly and the electronic body, wherein in response to the at least one elastic element pushing the switch assembly so that the switch assembly is in a first position, the cam is inserted into the first cavity or the second cavity of the movable element to limit rotation of the movable element relative to the electronic body, and in response to the switch assembly linearly moving to a second position by resisting at least one elastic force of the at least one elastic element, the movable element rotates relative to the electronic body to expand or close to the electronic body.

2. The support frame as claimed in claim 1, wherein a back surface of the electronic body has an opening, the button passes through the opening and is exposed on the electronic body, and the button is suitable for moving parallel to the back surface within the opening.

3. The support frame as claimed in claim 2, further comprising:
   a cover plate locked in the electronic body and comprising a first portion and a second portion, wherein a fastener hole is between the first portion and the second portion, the cam is fixed on the first portion, the switch assembly further comprises a fastening portion, the fastening portion is disposed corresponding to the second portion and integrally formed with the button, and the fastening portion is removably fastened in the fastener hole, so that the cam is removably inserted into the first cavity or the second cavity of the movable element.

4. The support frame as claimed in claim 3, wherein the fastening portion has an inclined surface, the second portion has a folded section, the folded section is disposed corresponding to and matching the inclined surface, and in response to the switch assembly linearly moving to the second position by resisting the at least one elastic force of the at least one elastic element, the folded section of the second portion limits movement of the switch assembly within the opening.

5. The support frame as claimed in claim 3, wherein in response to the fastening portion being fastened in the fastener hole, an orthographic projection of the fastening portion on the first portion partially overlaps an orthographic projection of the cam on the first portion.

6. The support frame as claimed in claim 2, wherein the at least one elastic element comprises two elastic elements, and each of the elastic elements is a spring.

7. The support frame as claimed in claim 2, wherein the at least one elastic element comprises a first elastic element and a second elastic element, the at least one elastic force comprises a first elastic force and a second elastic force, the first elastic element is connected between the switch assembly and the electronic body, and the second elastic element is connected to the movable element.

8. The support frame as claimed in claim 7, wherein in response to the switch assembly linearly moving to the second position by resisting the first elastic force of the first elastic element, the movable element rotates relative to the electronic body by the second elastic force of the second elastic element and expands relative to the electronic body.

9. The support frame as claimed in claim 8, wherein the first elastic element is a spring, and the second elastic element is a torsion spring.

10. The support frame as claimed in claim 7, wherein the electronic body further comprises a limiting cavity, the switch assembly is born within the limiting cavity, and the limiting cavity limits movement of the switch assembly within the opening.

11. The support frame as claimed in claim 1, wherein a back surface of the electronic body has an opening, the button passes through the opening and is exposed on the electronic body, and the button is suitable for moving perpendicular to the back surface within the opening.

12. The support frame as claimed in claim 11, further comprising:
a cover plate locked in the electronic body and having a limiting hole, wherein the switch assembly further comprises a limiting column, the limiting column, the cam, and the button are integrally formed, and the limiting column is movably sleeved in the limiting hole, so that the cam is removably inserted into the first cavity or the second cavity of the movable element.

13. The support frame as claimed in claim 12, wherein the cover plate comprises a limiting cavity disposed corresponding to the cam, and in response to the switch assembly linearly moving to the second position by resisting the at least one elastic force of the at least one elastic element, the limiting cavity limits movement of the switch assembly within the opening.

14. The support frame as claimed in claim 11, wherein the at least one elastic element comprises a plurality of elastic elements, and each of the elastic elements is a spring.

15. The support frame as claimed in claim 1, wherein the button has a rounded surface or a chamfered surface.

16. The support frame as claimed in claim 1, wherein an included angle is between the first cavity and the second cavity, and the included angle is greater than or equal to 90 degrees.

17. The support frame as claimed in claim 1, further comprising:
a rotation shaft connected to the electronic body and passing through a terminal portion of the movable element, wherein the movable element rotates relative to the electronic body with the rotation shaft as an axis.

18. The support frame as claimed in claim 1, wherein in response to the support frame being in a closed state, the switch assembly is in the first position, the cam is inserted into the first cavity of the movable element, and the movable element is contained in a containing cavity of the electronic body.

19. The support frame as claimed in claim 1, wherein in response to the support frame being in an opening process, the switch assembly is in the second position, and the movable element rotates relative to the electronic body and gradually expands from the electronic body, and in response to the support frame being in a closing process, the switch assembly is in the second position, and the movable element rotates relative to the electronic body and gradually closes in a containing cavity of the electronic body.

20. The support frame as claimed in claim 1, wherein in response to the support frame being in an open state, the switch assembly is in the first position, the cam is inserted into the second cavity of the movable element, and the movable element expands from the electronic body to support the electronic body.

* * * * *